March 25, 1930.  W. P. REAVES  1,751,530
STEREOSCOPIC APPARATUS
Original Filed Dec. 16, 1925   12 Sheets-Sheet 1
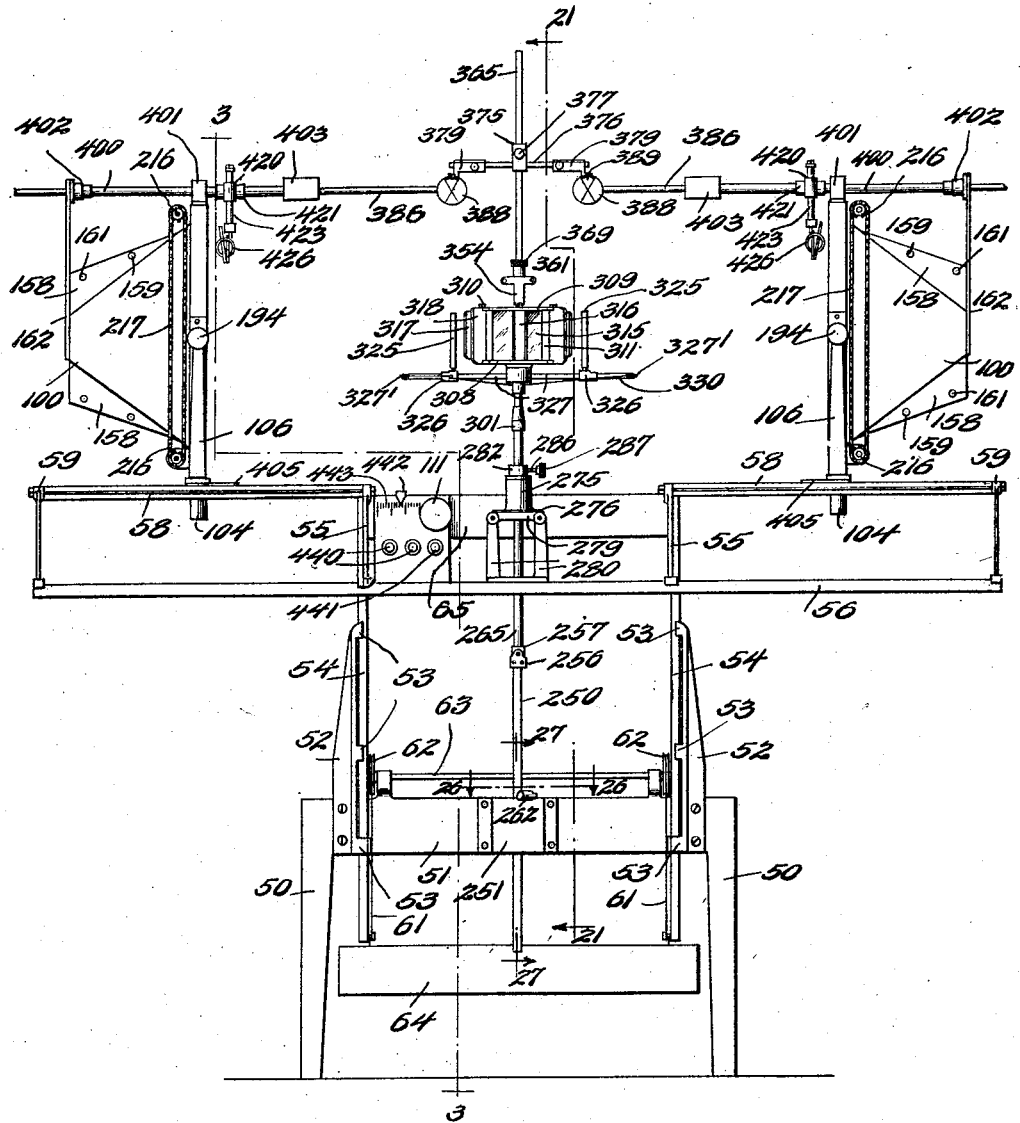

March 25, 1930. W. P. REAVES 1,751,530
STEREOSCOPIC APPARATUS
Original Filed Dec. 16, 1925 12 Sheets-Sheet 2
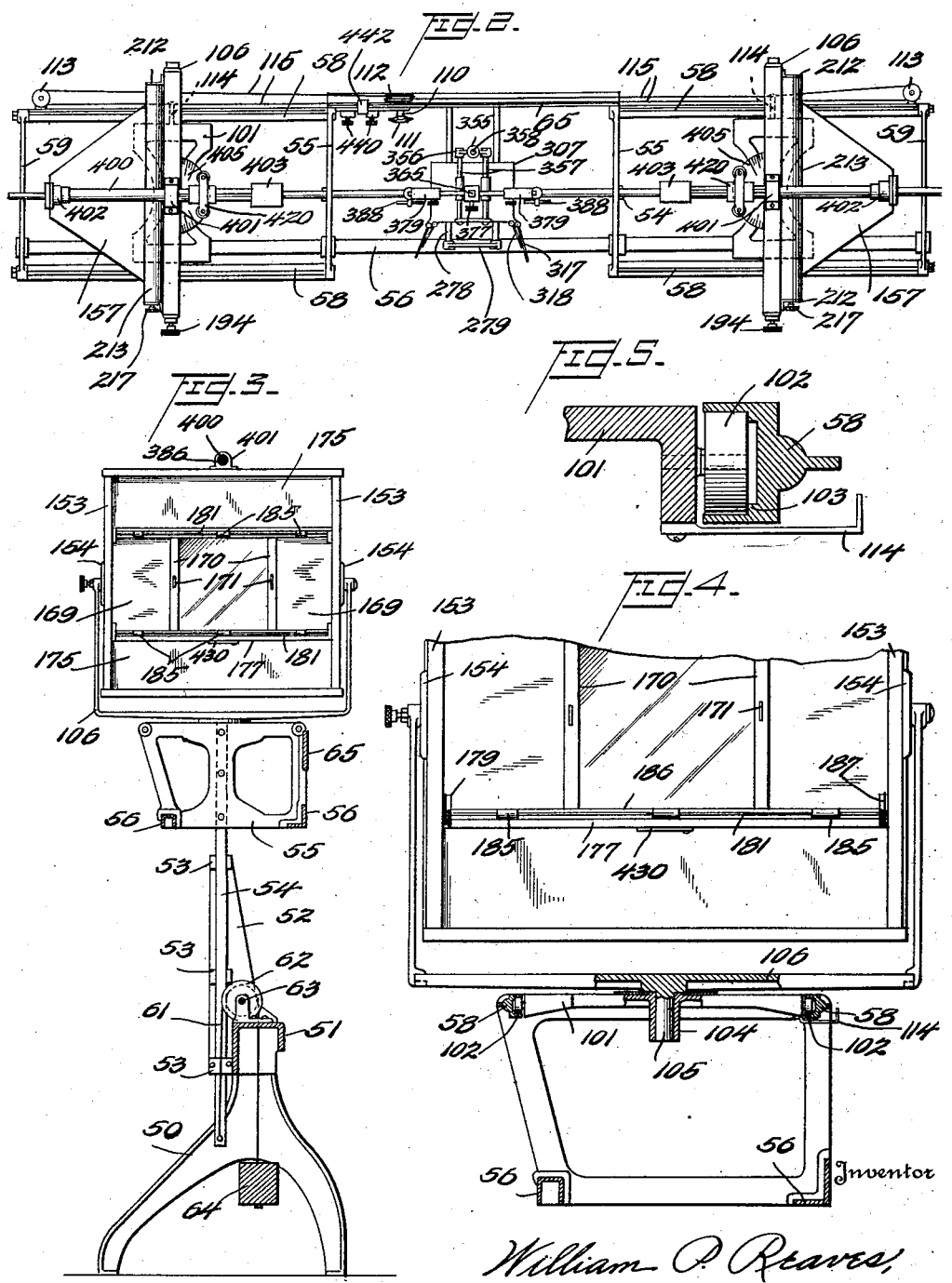

March 25, 1930.   W. P. REAVES   1,751,530
STEREOSCOPIC APPARATUS
Original Filed Dec. 16, 1925   12 Sheets-Sheet 3
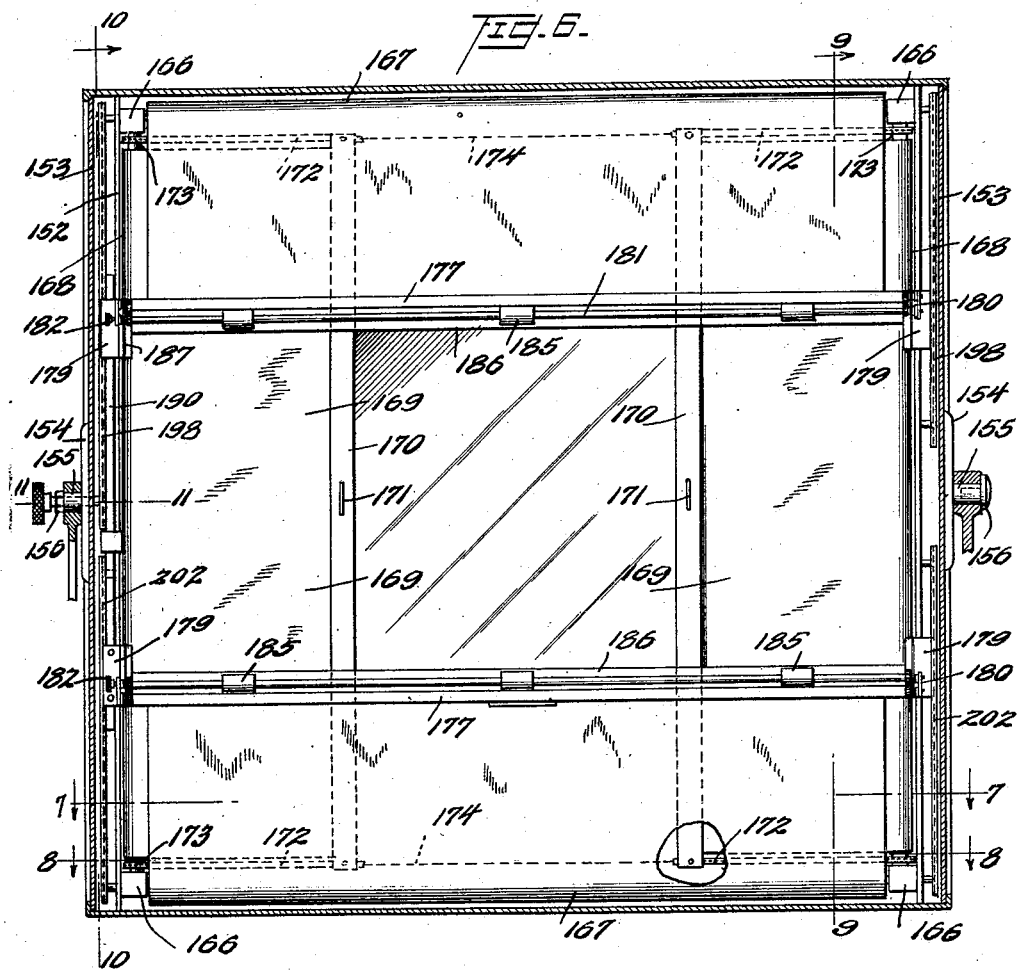
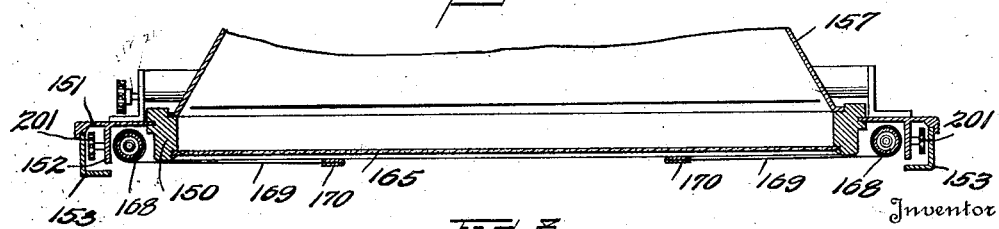
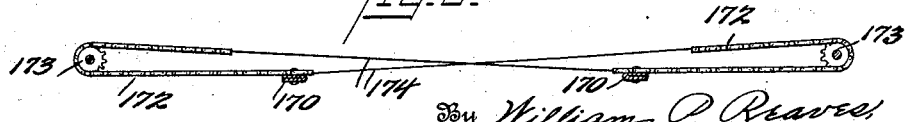

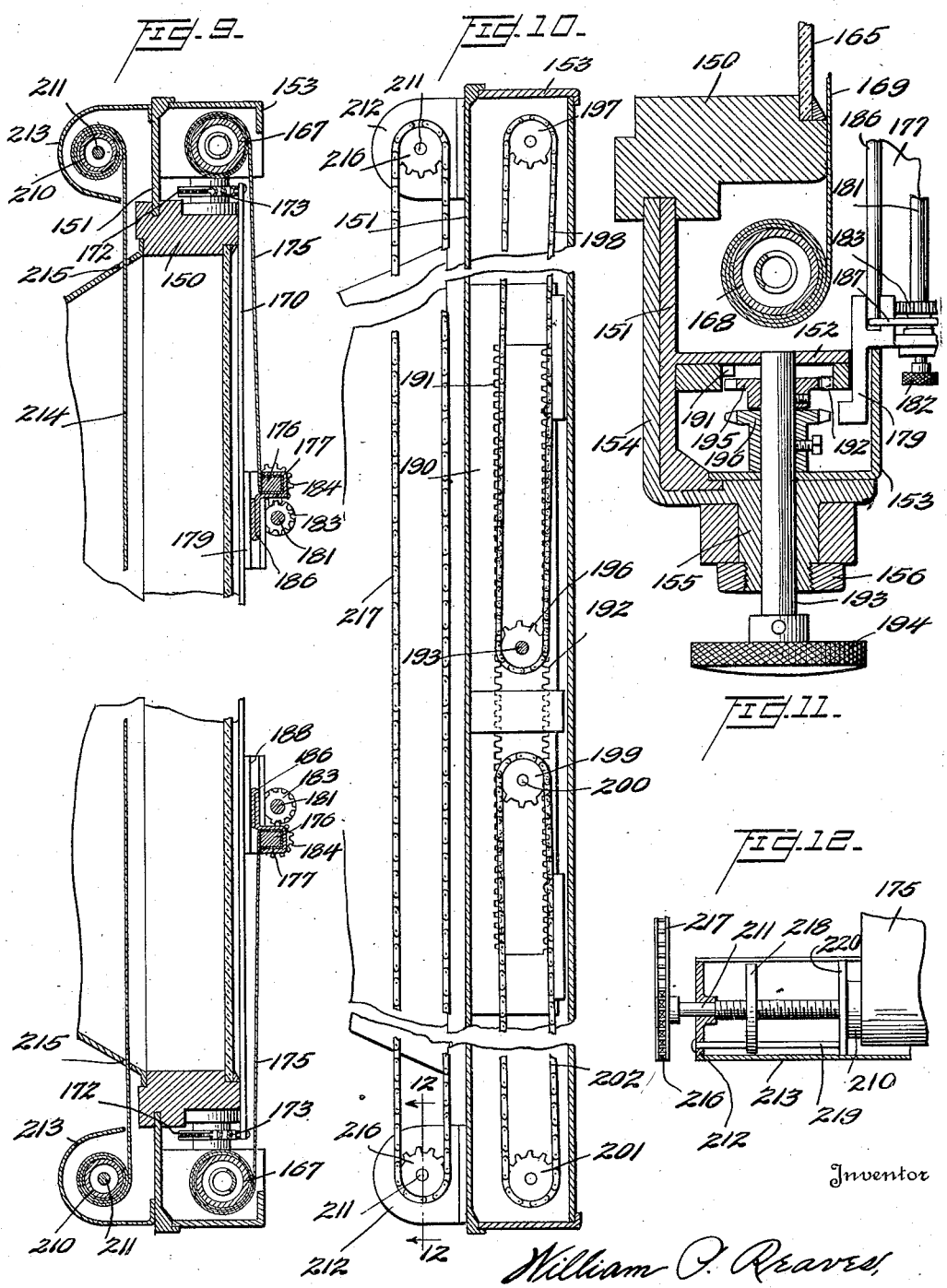

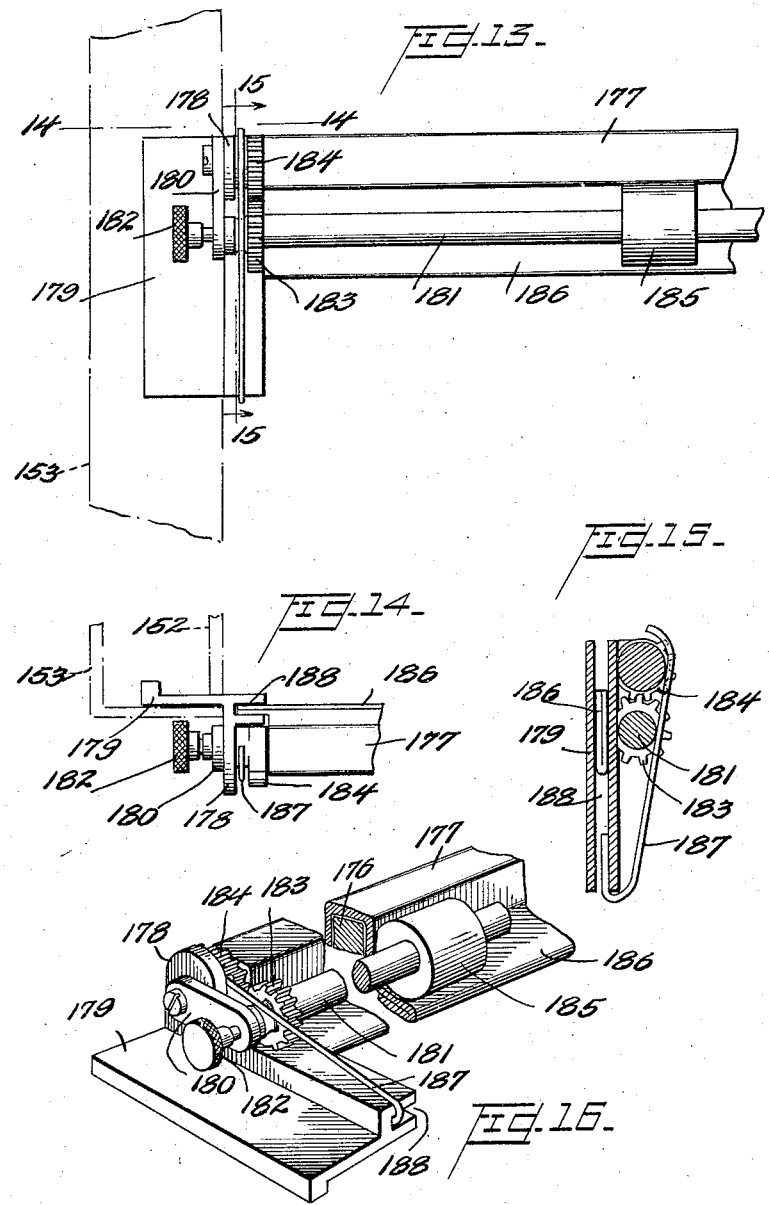

March 25, 1930.　　　W. P. REAVES　　　1,751,530
STEREOSCOPIC APPARATUS
Original Filed Dec. 16, 1925　　12 Sheets-Sheet 6
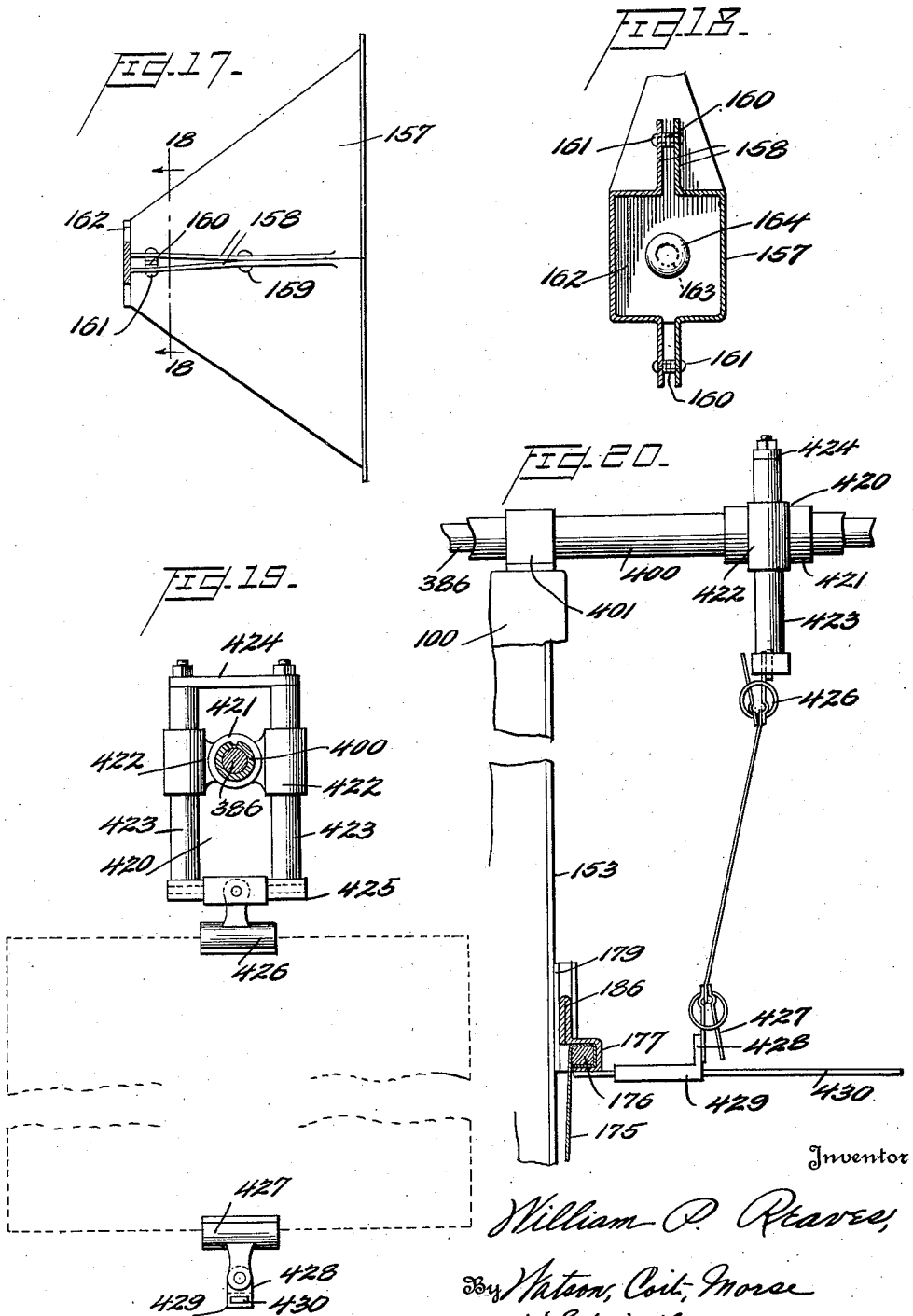

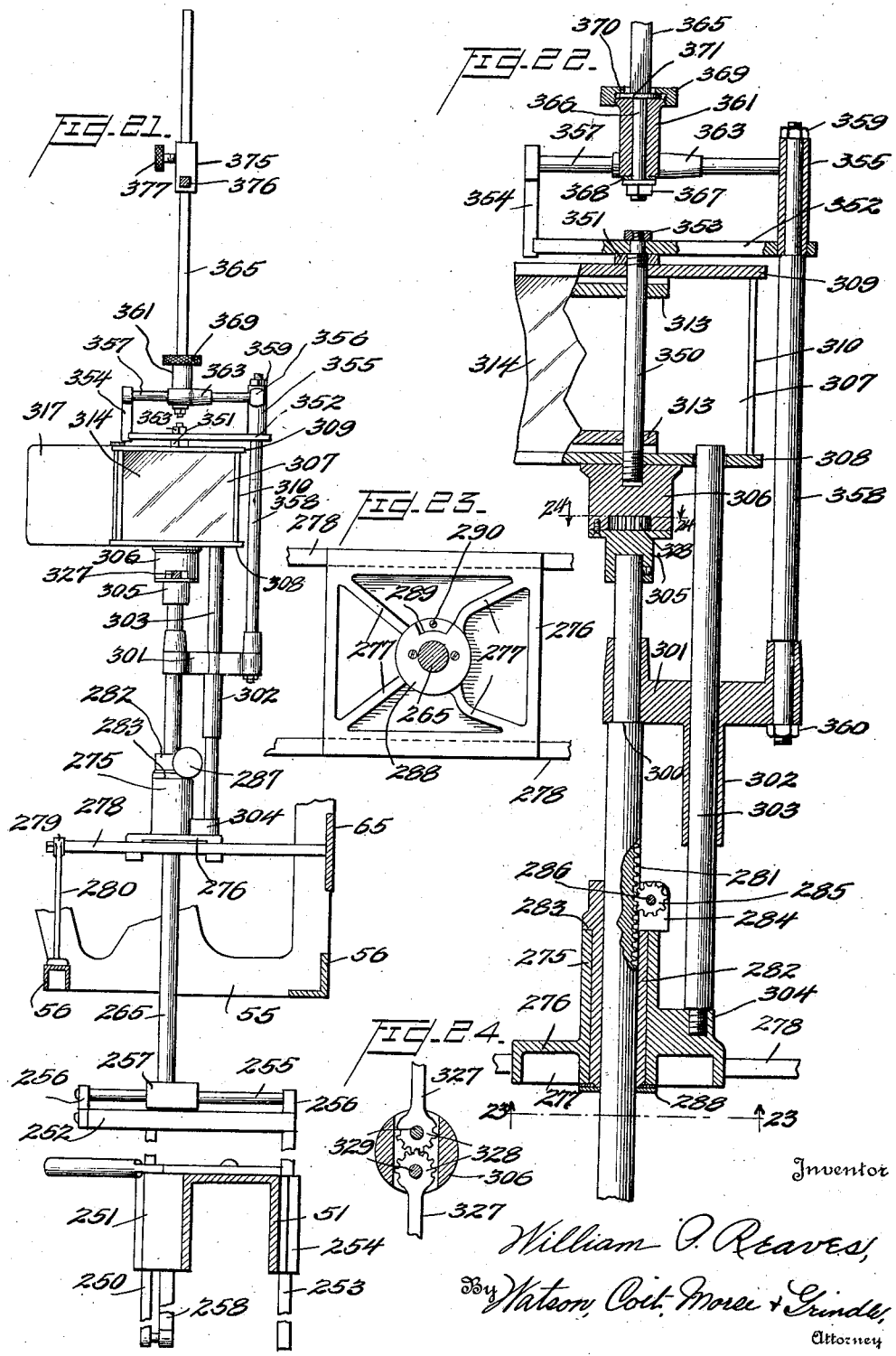

March 25, 1930. W. P. REAVES 1,751,530
STEREOSCOPIC APPARATUS
Original Filed Dec. 16, 1925 12 Sheets-Sheet 8
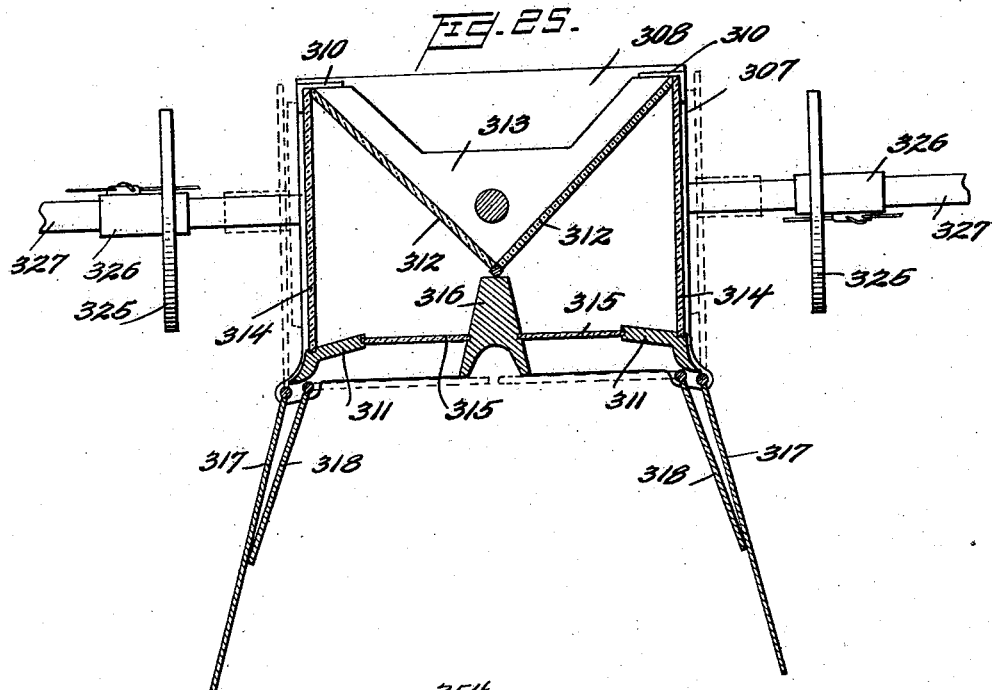
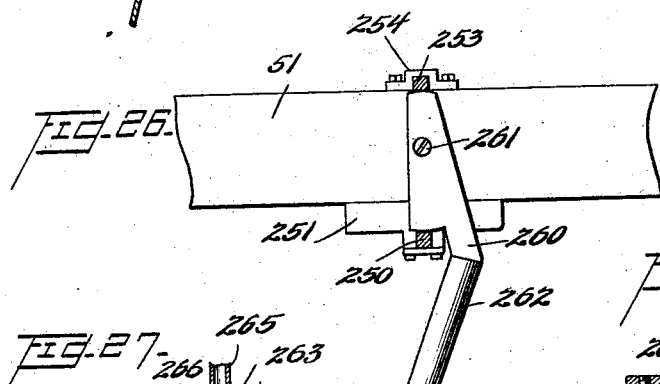
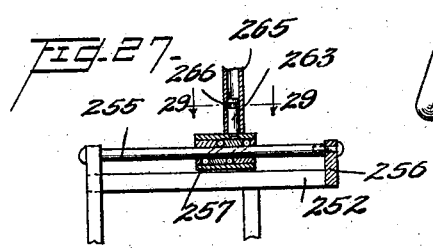
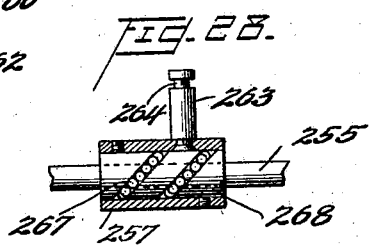
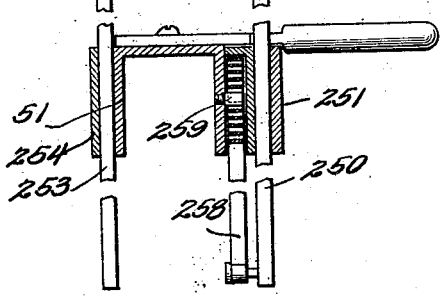
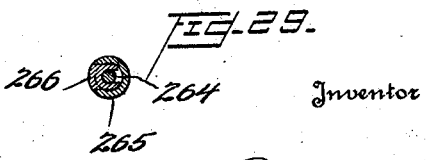

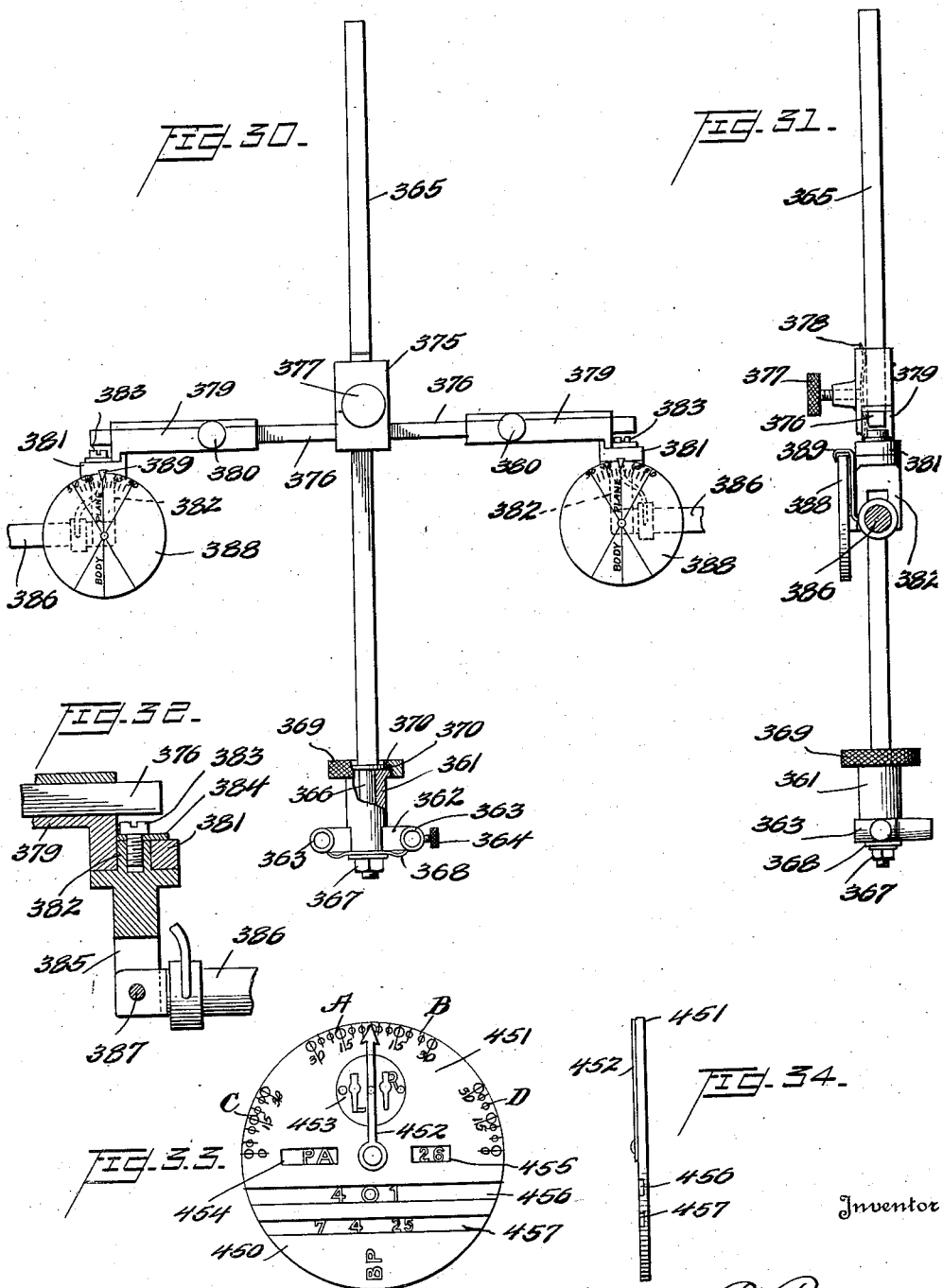

March 25, 1930. W. P. REAVES 1,751,530
STEREOSCOPIC APPARATUS
Original Filed Dec. 16, 1925  12 Sheets-Sheet 10
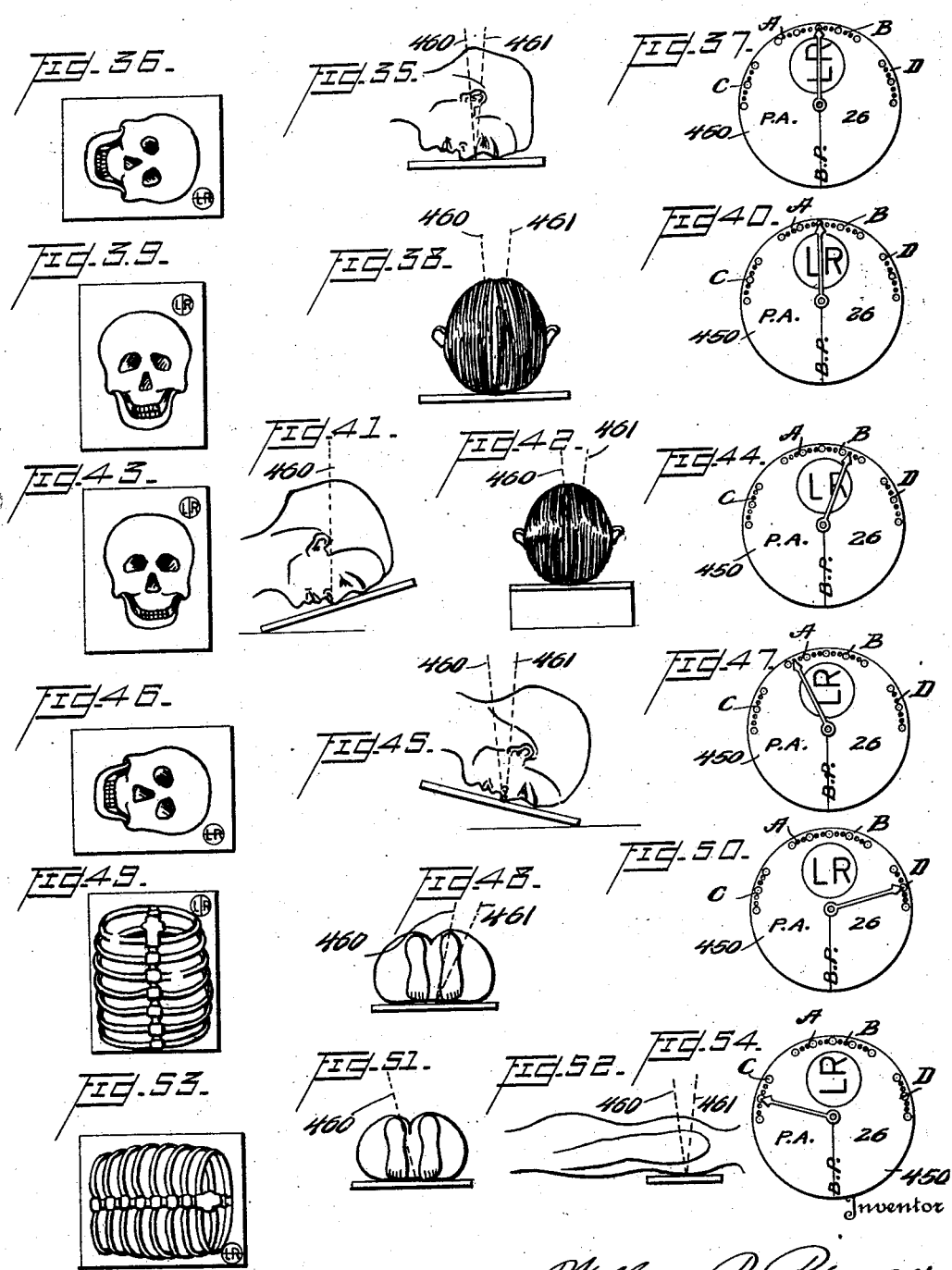

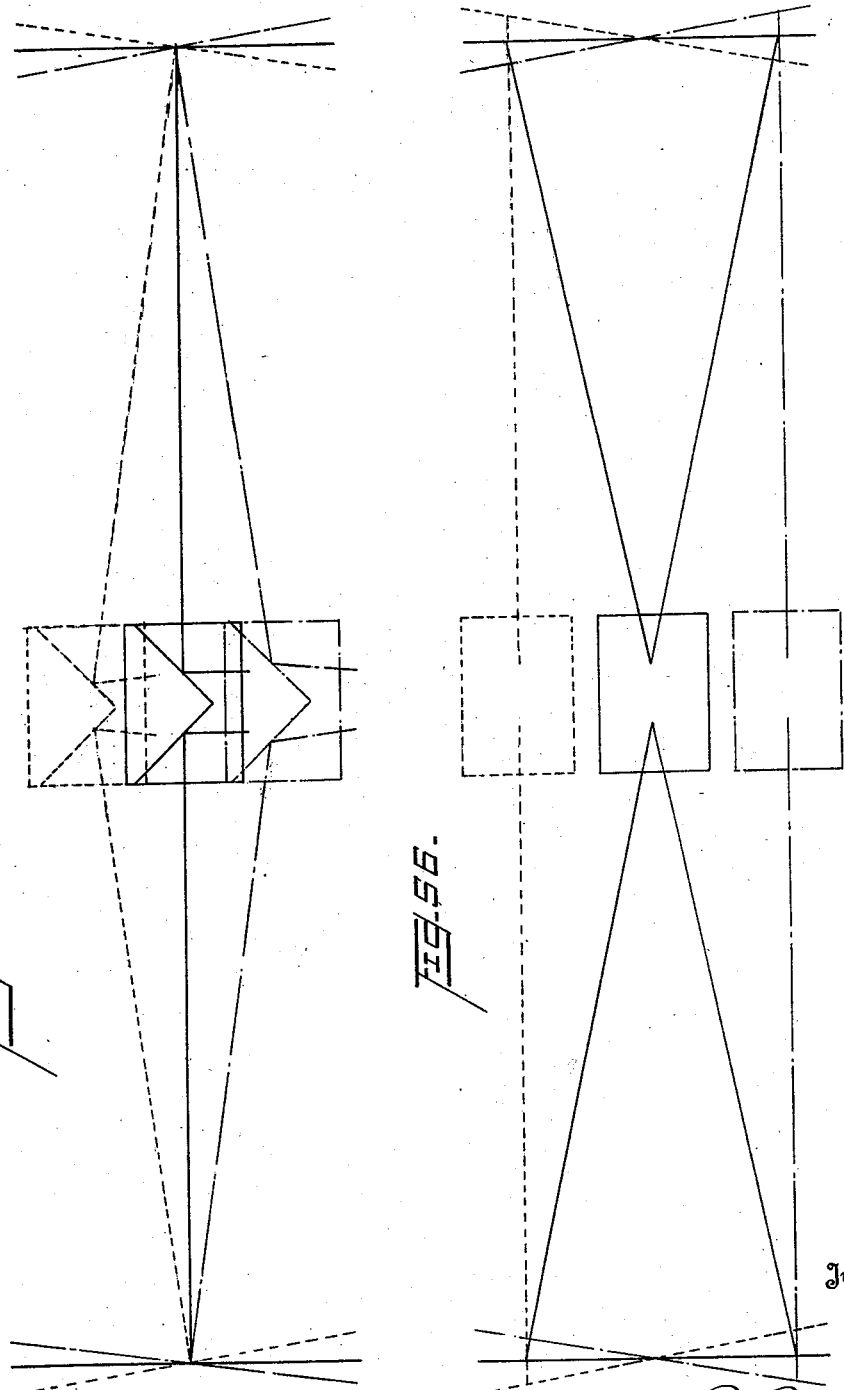

March 25, 1930. W. P. REAVES 1,751,530
STEREOSCOPIC APPARATUS
Original Filed Dec. 16, 1925   12 Sheets-Sheet 12
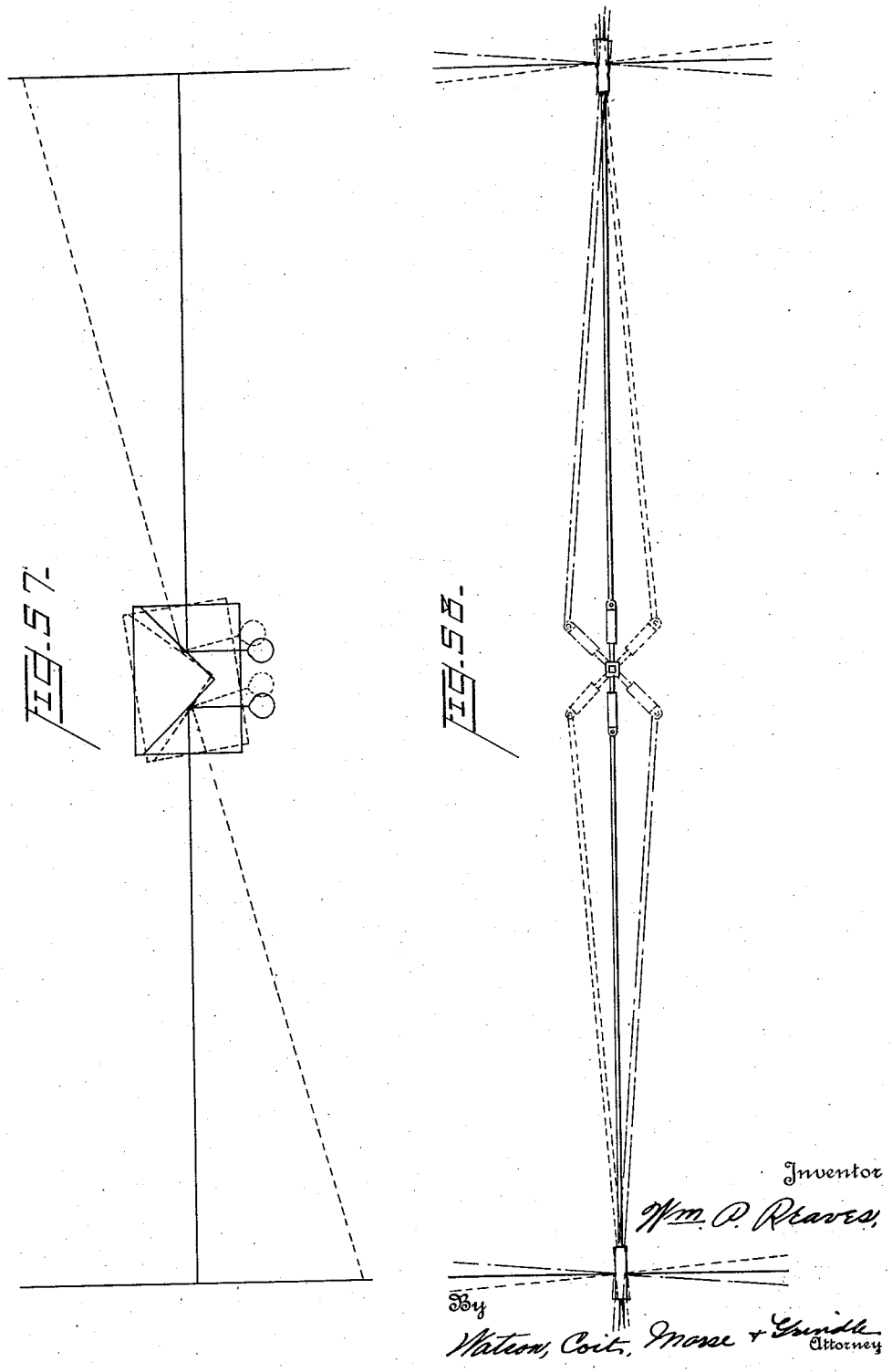

Patented Mar. 25, 1930

1,751,530

UNITED STATES PATENT OFFICE

WILLIAM P. REAVES, OF GREENSBORO, NORTH CAROLINA

STEREOSCOPIC APPARATUS

Application filed December 16, 1925, Serial No. 75,822. Renewed September 2, 1926.

The present invention relates to stereoscopic apparatus and particularly to stereoscopes of the Wheatstone or reflecting type designed and constructed for use in radiographic diagnosis.

This application is a continuation in part of my copending application, Serial No. 672,572, filed November 3, 1923.

In radiographic diagnosis, particularly where it is desired to obtain a true estimate of the position of a foreign object within the human body or to study tissue changes caused by disease, it is the present practice to take two separate radiographs with the target of the X-ray tube at points about two and one-half inches apart, which is the average interpupilary distance, and to mount the paired radiographs in a stereoscope to be simultaneously observed by the diagnostician.

By viewing the paired radiographs reflected from suitable mirrors with the observer's eyes positioned at points bearing the same relation to the radiographs as the target of the X-ray tube bore to the cassette or holder when the radiograph films were exposed, an impression of relief is obtained from which the diagnostician can make deductions as to the size, depth, and position of foreign bodies in the human body, or study the changes of diseased tissues. In taking the radiographs the target is placed at any desired distance from the plate in the cassette, usually about twenty-five inches, which is a distance at which normal eyes easily focus. One plate is exposed for each position of the target of the X-ray tube and, after being developed, these plates are placed facing each other in such position that by means of reflecting mirrors positioned intermediate the same, the observer may see one plate with one eye and the other plate with the other eye, the two pictures appearing as one in relief, if the plates are properly arranged. The plates should be arranged in the stereoscope with great care and exactitude in order that the object may be viewed without distortion or undue fatigue upon the eyes. Taking any particular point on one radiograph, for instance, the light ray from this point to observer's eye should theoretically make the same angle horizontally and vertically with the radiograph as a ray from the target, passing thru that point, made with the plate during exposure. That is, the eye bears as nearly as possible the same relative relationship to the plate in the steroscope as the target bore to the plate during exposure. The more accurately the radiographs are adjusted to correspond with theoretical conditions, the greater the effect of relief realized and hence the clearer the details appear to the observer.

It is often the case that an object appears in different positions upon two plates of a set, due to the fact that the two plates are not held in exactly the same position in the cassette when the exposures are made. Thus an object which may appear in the center of one plate may be not only horizontally and vertically displaced from the center of the second plate but may also be at a different angle to the side of the plate. In the old type of stereoscope in which the plates bore a fixed angular relation to the mirrors, such disalignment would prevent the proper portrayal of the binocular image. In my improved stereoscope two pictures of the same object may be substantially aligned, notwithstanding differences in the positioning of the images on their respective plates. That such misalignment often occurs in practice will be seen from the fact that in order to get an object in the same position on the two plates, it is necessary to have the two plates placed in the cassette in exactly corresponding positions, and it is also necessary to move the X-ray tube between the exposures the interpupilary distance in a lateral plane, at the same time preserving the same relative position in regard to all planes. These conditions are extremely difficult to fulfill in practice and the result is that slight variations in the positions or alignment of the two images on their respective plates often occur. Where means are not provided for adjusting the radiographs relative to the mirrors, the result would be a distortion of the object and a considerable strain upon the observer's eyes.

A stereoscopic apparatus according to my invention comprises a pair of radiograph supports or illuminating boxes facing each other and adapted to be moved toward or from each other in unison, since the radiograph plates must always be equidistant from the mirrors. Midway between the two illuminating boxes is mounted a mirror box containing two mirrors set at an angle of 90° to each other and normally at an angle of 45° to the corresponding illuminating box. Means are provided for raising and lowering the entire apparatus so that it may be adjusted to observers of different height in either standing or sitting positions. Each illuminating box is pivotally mounted about both horizontal and vertical axes. Means are also provided for so connecting the illuminating boxes to the mirror box that the relationship of the observer's eye to any point on the corresponding plate is not altered upon horizontal movement of the mirror box to accommodate the apparatus to the peculiarities of vision of the observer or upon vertical movement of the same to inspect the tops or bottoms of the plates. In order that the relationship between the plates and the observer's eyes may not be destroyed by any such movement of the mirror box, the radiograph supports are connected to the latter in such manner that vertical or horizontal movement of the mirror box results in compensating movement of the illuminating boxes. In other words, it is not only possible to place the several boxes in the precise relation desired initially, but this relationship is substantially maintained for all adjustments of the mirror box. The mirror box may also be freely rotated on a vertical axis to inspect points adjacent the front or rear edges of the plates.

Lenses are provided in connection with the mirror box to assist in focusing the eyes upon the radiograph films, and also for the purpose of enlarging the images. These lenses are mounted in a novel manner so that they may be swung into or out of operative position and also may be adjusted towards or from the mirror box in unison. They eliminate the necessity of using reading glasses for close study of the radiograph films.

My apparatus also includes means for placing a color screen between each of the radiograph plates and the source of light therefor. The color of this screen may be changed to suit the necessities of any particular type of work or the degree of sensitiveness of the observer's eyes to any particular color. It has been found that this chromatic illumination gives greater contrast to the shadows on the radiograph films, thereby increasing the stereoscopic effect due to the binocular angles at which the two radiograph films were exposed, and giving greater depth, position and detail to the single transparent image formed by the fusion of the two radiograph views.

The supporting stand and the means for mounting the reflecting and illuminating boxes are also of novel construction, and the apparatus as a whole has many features of novelty not specifically pointed out above, which will, however, be pointed out in the appended claims.

It is the general object of this invention to provide a stereoscopic apparatus by means of which the greatest degree of accuracy of observation may be realized by the observer.

It is a further object of the present invention to provide means for adjusting the radiograph supports relative to the mirrors so that the positions and angles of the plates or films to the target of the X-ray tube when the former were exposed may be substantially duplicated.

It is a still further object of my invention to provide means for simultaneously coordinating the positions of the radiograph supports and the mirrors so that movement of the latter results in compensating movement of the former, whereby the mirrors may be moved to accommodate the same to the peculiarities of vision of the observer or in inspecting various parts of the plate without disturbing the angular relationship of the observer's eyes to the radiograph plates.

Another object of the invention is to provide chromatic illumination by means of which the details, position and dimensions of the object under observation are intensified, thereby increasing the efficiency of interpretation and diagnosis.

Other objects and advantages of my invention will be apparent from the following description, taken in conjunction with the accompanying drawings, which form a part of this specification, and in which, Figure 1 is a front elevation of the entire apparatus;

Figure 2 is a top plan view thereof;

Figure 3 is a vertical section taken on the line 3—3 of Figure 1;

Figure 4 is an enlarged fragmentary view of a portion of Figure 3, parts being broken away;

Figure 5 is a detail view showing the manner in which the illuminating boxes are mounted to slide on their supporting rails;

Figure 6 is an enlarged vertical section thru one of the illuminating boxes, taken on the line 6—6 of Figure 7;

Figure 7 is a fragmentary horizontal section taken on the line 7—7 of Figure 6;

Figure 8 is a detail view taken substantially on the line 8—8 of Figure 6;

Figure 9 is a fragmentary vertical section taken on the line 9—9 of Figure 6;

Figure 10 is a similar view taken on the line 10—10 of Figure 6;

Figure 11 is an enlarged fragmentary horizontal section taken on the line 11—11 of Figure 6;

Figure 12 is a fragmentary vertical section taken on the line 12—12 of Figure 10 showing the construction of the stop mechanism for the color roller;

Figure 13 is an enlarged elevation of one end of one of the plate holders for the illuminating boxes and its associated parts;

Figure 14 is a plan view of the same, taken on the line 14—14 of Figure 13;

Figure 15 is a vertical section taken on the line 15—15 of Figure 13;

Figure 16 is a perspective view of the same;

Figure 17 is a detail plan view of the light casing of one of the illuminating boxes;

Figure 18 is a section on the line 18—18 of Figure 17;

Figure 19 is a detail front elevation of the wet film holder and associated parts;

Figure 20 is a side elevation of the same, parts being broken away;

Figure 21 is an enlarged side elevation of the mirror box and its associated parts, the supporting framework being shown in section, and the view being taken substantially on the line 21—21 of Figure 1;

Figure 22 is an enlarged vertical transverse central section thru a portion of Figure 21;

Figure 23 is a fragmentary horizontal section taken on the line 23—23 of Figure 22;

Figure 24 is a similar view taken on the line 24—24 of Figure 22;

Figure 25 is an enlarged horizontal section thru the mirror box;

Figure 26 is an enlarged fragmentary horizontal section taken on the line 26—26 of Figure 1;

Figure 27 is an enlarged fragmentary vertical section taken on the line 27—27 of Figure 1;

Figure 28 is a detail view showing the construction of the ball bearing shown in Figure 27;

Figure 29 is a detail view taken on the line 29—29 of Figure 27;

Figure 30 is an enlarged front elevation of the mechanism connecting the mirror box and the illuminating boxes, parts being broken away;

Figure 31 is a side elevation of the same;

Figure 32 is an enlarged central longitudinal section of a portion of Figure 30, showing the details of the universal joint;

Figure 33 is a front elevation of an indicating marker carrying identifying matter which is radiographed on the plate or film;

Figure 34 is a side elevation of the same;

Figure 35 is a side elevation of a patient's head showing diagrammatically the exposure angles of a pair of radiographic plates with the tube and the cassette in certain relative positions.

Figure 36 is a diagrammatic front view of one of the plates exposed as in Figure 35, showing the position in which it is mounted in one of the illuminating boxes of the stereoscope;

Figure 37 is a front elevation of my marker, showing the indicating elements thereon in the correct position for plates exposed as in Figure 35;

Figure 38 is an end elevation of a patient's head looking from head to foot and showing diagrammatically the exposure angles of a pair of radiographic plates with the tube in different positions with respect to the cassette than in Figure 35;

Figure 39 is a diagrammatic front view of one of the plates exposed as in Figure 38, showing the position in which it is mounted in one of the illuminating boxes of the stereoscope;

Figure 40 is a front elevation of my marker, showing the indicating elements thereon in the correct position for plates exposed as in Figure 38;

Figure 41 is a side elevation of a patient's head showing diagrammatically the exposure angles of a pair of radiographic plates with the tube in still different positions with respect to the cassette;

Figure 42 is an end elevation of the same, looking from head to foot;

Figure 43 is a diagrammatic front view of one of the plates exposed as in Figures 41 and 42, showing the position in which it is mounted in one of the illuminating boxes of the stereoscope;

Figure 44 is a front elevation of my marker, showing the indicating elements thereon in the correct position for plates exposed as in Figures 41 and 42;

Figure 45 is a side elevation of a patient's head showing diagrammatically the exposure angles of a pair of radiographic plates with the tube in still other positions with respect to the cassette;

Figure 46 is a diagrammatic front view of one of the plates exposed as in Figure 45, showing the position in which it is mounted in one of the illuminating boxes of the stereoscope;

Figure 47 is a front elevation of my marker, showing the indicating elements thereon in the correct position for plates exposed as in Figure 45;

Figure 48 is an end elevation of a patient's body looking from foot to head, showing diagrammatically the exposure angles of a pair of radiographic plates in still other positions of the tube with respect to the cassette;

Figure 49 is a diagrammatic front view of one of the plates exposed as in Figure 48, showing the position in which it is mounted in one of the illuminating boxes of the stereoscope;

Figure 50 is a front elevation of my marker, showing the indicating elements thereon in the correct position for plates exposed as in Figure 48;

Figure 51 is an end elevation of a patient's body looking from foot to head, showing diagrammatically the exposure angles of a pair of radiographic plates in still other positions of the tube with respect to the cassette;

Figure 52 is a side elevation of the same;

Figure 53 is a diagrammatic front view of one of the plates exposed as in Figures 51 and 52, showing the position in which it is mounted in one of the illuminating boxes of the stereoscope;

Figure 54 is a front elevation of my marker, showing the indicating elements thereon in the correct position for plates exposed as in Figures 51 and 52;

Figure 55 is a diagram showing how the mirror box may be moved horizontally to compensate for peculiarities of the observer's vision without disturbing the angle which the light ray from a given point on the plate to the observer's eye makes with the plate;

Figure 56 is a diagram showing how the mirror box may be moved vertically to bring a point near the top or bottom of the plate into the direct line of the observer's vision without disturbing the angle which the light ray from that point to the observer's eye makes with the plate;

Figure 57 is a diagram showing how the mirror box may be rotated about its vertical axis to inspect a point near the front or rear edge of the plate; and Figure 58 is a diagram showing the effect upon the positions of the illuminating boxes of a simple rotative movement of the connecting mechanism.

Referring to the drawings, in which like reference characters denote like parts throughout the several views thereof, and more particularly to Figures 1, 2 and 3, a pair of end supports 50, each of which is preferably bifurcated as shown in Figure 3, are rigidly joined by a channel-shaped cross bar 51 securely bolted thereto. Guides 52 are secured at each end of the bar 51 and are provided with lugs 53 adapted to hold in place square supporting rods 54. The upper ends of these supporting rods 54 are bolted to trapezoidal shaped webs or frames 55, each having its top and bottom edges horizontal and its back edge vertical, to the bottom of which are secured a pair of horizontal beams 56 which correspond to the usual table for supporting the various parts of the apparatus. To the upper end of each web 55 is secured a pair of channel-shaped rails 58, the grooves of which face towards each other. The rails 58 and the beams 56 are connected together at their outer ends by trapezoidal shaped frames or webs 59, which may be somewhat similar in construction to the webs 55, except that the center brace of the latter is unnecessary here. The beams 56 extend the entire length of the apparatus, whereas the rails 58 only extend outwardly from the webs 55, each pair of rails forming a trackway for one of the illuminating boxes. The front beam 56 is shown as a channel bar, while the rear beam 56 is shown as an angle bar, but this particular point is immaterial, and any desired construction may be adopted.

The lower end of each of the supporting rods 54 has secured thereto a cable 61 passing around a pulley 62 mounted on a shaft 63 secured to cross bar 51, and secured at its lower end to a counterweight 64 which is designed to counterbalance the weight of the entire apparatus, so that the rods 54 may be readily moved up or down in their guideways and will remain in any position in which they are placed.

A vertical panel 65 is secured at its ends to the back vertical edges of the webs 55, and serves to support various parts of the apparatus, as will be pointed out hereafter.

Illuminating boxes 100 are mounted to slide upon each pair of rails 58, and are arranged so as to face each other. The illuminating boxes are identical in construction and one only, therefore, need be described. Each illuminating box comprises a base or platform 101, shown clearly in Figures 2 and 4, which is provided with wheels 102 adapted to roll in the grooves in the channel-shaped rails 58. The rails 58 are preferably provided with shoulders 103 which bear against the ends of the wheels 102 so that the platforms 101 are accurately centered, at the same time with less resistance to the movement of the wheels than would be the case if the entire inside face of rails 58 bore against the ends of the wheels 102. The platform 101 is provided at its center with a hub or boss 104 thru which extends a spindle 105 carrying at its upper end a yoke 106. This yoke may be made in one piece or of three pieces joined together as shown in Figure 4. The illuminating box 100 is pivoted about a horizontal axis between the arms of the yoke 106. The illuminating box may thus be given a rotative movement about the axis of spindle 105 or a tilting movement about the horizontal axis thru yoke 106, or both, as may be desired.

Means is provided as illustrated in Figure 2 for moving the illuminating boxes 100 toward or from each other in unison on their rails 58. A horizontal shaft 110 is mounted in a suitable bearing in panel 65, and has a hand wheel 111 on its front end and a pulley 112 on its back end. Pulleys 113 are mounted on each of the upper rear corners of the frame work so as to rotate on a vertical axis. A lug or hook 114 is secured to each of the platforms 101, and extends towards the rear of the apparatus. The construction of the lugs 114 is clearly shown in Figure 5. A wire cord 115 is wrapped once around the pulley 112 and has one end thereof secured to one of the illuminating boxes by means of its lug 114. The other end of the cord 115 extends around the pulley 113 adjacent the opposite illuminating box, is secured to the second lug 114, passes around the pulley 113 adjacent the first lug, and is then secured to the first lug 114. By this construction, rotation of the hand wheel 111 will cause the illuminating boxes 100 to move towards or from each other in unison.

The construction of the illuminating box proper is shown in Figures 6 to 18. Each box comprises a rectangular frame 150 which may be constructed of wooden bars. A metal frame 151 extends completely around the wooden frame and is set into a groove in the outer surface of the wooden frame as shown in Figure 7. The frame 151 is provided with an integral forwardly extending flange 152. Angle bars 153 are secured to the outer ends of the frame 151 so that the free end of the angle bar projects in front of, but is slightly spaced from the flange 152. Either the wooden frame 150 or the metal frame 151 may be constructed in parts so that they may be joined together by the tongue and groove construction as shown in Figure 7 and described above. A member 154 is secured to the frame 151 and angle bars 153 at the center of each side of the illuminating box, and is provided with a spindle 155 which is journaled in an aperture in the upper end of yoke 106. A nut 156 is threaded on the end of each spindle 155, and prevents the spindles from coming out of the yoke. The shape of the members 154 is best shown in Figures 6 and 11.

A pyramid-shaped sheet metal light casing 157 is secured to the back of the frame 150, as shown in Figures 7 and 9. The casing is preferably made in two pieces joined on a vertical plane. Each half is provided along its top and bottom edges with projecting fins 158. The front portions of these fins are clamped closely together by rivets 159, but the rear portions are spaced apart by spacing washers 160 on rivets 161 as shown in Figures 17 and 18. Upper and lower ventilating openings are thus provided which serve to keep the light bulb and the illuminating box cool. The small end of the casing 157 is closed by a vertical plate 162 which carries a socket 163 supporting an electric lamp 164, both shown diagrammatically in Figure 18.

A glass plate 165 is set in the front of the frame 150 as shown in Figure 7. Each illuminating box is provided with two vertical and two horizontal curtains so arranged that a film or plate may be supported in the center of the illuminating box in front of the glass plate 165. A square block 166 is secured to the frame 151 near each corner thereof. These blocks serve as bearing blocks for the curtain rollers, which may be spring rollers of any usual type. The horizontal rollers 167 have shafts extending completely thru the blocks 166, as shown in Figure 6. The shafts of the vertical rollers 168 project far enough into the blocks 166 to securely support the same, but not far enough to interfere with the shafts of the horizontal rollers 167.

Each of the vertical rollers 168 is provided with an opaque curtain 169. One end of the curtain is secured to the roller and the other end is provided with a U-shaped piece of sheet metal 170 fastened thereto as shown in Figures 6 and 7. Each of these metal strips is provided with a handle 171 which may be formed of a stiff wire loop. The curtains 169 are guided in a vertical plane between the edge of frame 150 and of angle bars 153. The ends of the metal strips 170 are each connected to a chain 172, which passes over sprockets 173 secured to the shafts of the rollers 168. The ends of the chains 172 are connected together by crossed wire cables 174 as shown in Figure 8. It will be seen that if the operator grasps one of the handles 171 and moves the corresponding curtain 169 in either direction the other curtain of the vertical pair will be moved in the opposite direction, so that the two curtains are moved towards or from each other in unison by this construction, and the opening between them is always accurately centered with respect to the illuminating box as a whole.

The horizontal rollers 167 are similarly provided with opaque curtains 175. These curtains are preferably mounted in front of the curtains 169. The free end of each curtain 175 is clamped between a square bar 176 and a bent sheet metal member 177, the construction of which is most clearly shown in Figure 16. Each end of the bars 176 is secured to an ear 178 projecting outwardly from a plate-like member 179. The members 179 are adapted to slide in the space between the flange 152 and the angle bar 153, which serve to guide them in a vertical plane. An arm or link 180 is pivoted to the ear 178 and at its outer end carries a rotatably mounted shaft 181 provided with a hand wheel 182. A pinion 183 is fixedly secured to said shaft 181 and is adapted to engage a fixed pinion 184 secured to the ear 178. It will thus be seen that by turning the hand wheel 182 the pinion 183 will rotate about the pinion 184 thereby producing a corresponding rotation of the link 180, the pivotal axis of the link 180 being on the same line with the center of the pinion 184. The shaft 181 is provided with a plurality of soft rubber rollers 185 secured thereto, these rollers being adapted to engage a flange 186 which forms an integral part of the sheet metal member 177. A wire spring 187 has one end held in a slot 188 formed in the member 179, and the spring wire is bent so as to bear upon a grooved portion of the shaft 181 and a grooved extension of the pinion 184. It will thus be seen that the spring 187 tends to hold the rollers 185 firmly against the flange 186. The side edge of each flange 186 preferably extends into the slot 188, as shown in Figures 14 and 15. The radiograph plate or film is held in place between the rollers 185 and the flanges 186 on the upper and lower vertical curtains respectively.

The means for operating the horizontal curtains is shown in Figures 10 and 11 and will now be described. A slotted plate 190 is mounted so as to slide vertically against the flange 152 of the frame 151. The slot is provided with internal rack teeth 191 on one side thereof and 192 on the other side thereof, these sets of teeth being laterally spaced from each other as shown in Figure 11. A shaft 193 carrying a hand wheel 194 passes horizontally thru an aperture in the spindle 155 and has its inner end mounted in a bearing in flange 152. A pinion 195 is secured to the shaft 193 and is of such width as to engage with the rack teeth 191 or the rack teeth 192, but not both at the same time. The shaft 193 is horizontally movable in its bearings so that the pinion 195 may be placed in position to engage the desired set of rack teeth. A sprocket wheel 196 is also secured to the shaft 193 and is connected to a sprocket 197 on the shaft of the upper curtain roller 167 by a chain 198. A sprocket wheel 199 is rotatably mounted on a stud shaft 200 secured to the flange 152, and is connected to a sprocket wheel 201 on the shaft of the lower roller 167 by a chain 202. The lower curtain is secured to the sliding rack 190 and the upper curtain is secured to the chain 198.

When the hand wheel 194 is in the position shown in Figure 11 and is turned in a counterclockwise direction, looking at Figure 10, the rack 190 will be moved upwardly carrying with it the lower vertical curtain. At the same time the upper vertical curtain, which is secured to the chain 198, will be moved upward an equal distance so that the space between the two curtains will remain the same. If now the hand wheel 194 be pushed inwardly so that the pinion 195 engages the rack teeth 191, the rack 190 will be moved downwardly if the hand wheel is rotated counterclockwise, while the upper vertical curtain will continue to move upward, thereby increasing the distance between the curtains. By reversing the direction of rotation of the hand wheel 194 the curtains may be brought closer together. The method of procedure is to first secure the correct distance between the curtains, mount the radiograph between the rollers 185 and flanges 186, and then move the curtains, maintaining the same distance between them, until the radiograph is accurately centered.

Means are also provided for inserting a colored screen between the source of light and the radiograph. This preferably takes the form of a pair of horizontal rollers 210 having shafts 211 mounted in ears 212 secured to the frame 151, as shown in Figure 9. A sheet metal casing 213 surrounds each of the rollers 210. A color roll 214 is mounted on the rollers 210 and passes thru openings 215 in the light casing 157. Sprocket wheels 216 are secured to the shafts 211 of each of the rollers 210 and are connected by a chain 217. The color roll may be moved into the desired position simply by pulling on one side or the other of the chain 217, which is disposed on the outside of the illuminating box. Different sections of the color roll may be made in different colors so that light of any desired color may be secured simply by bringing the desired portion of the color roll into operative position. One section of the roll is made of colorless, transparent material so that the electric light may be used in its natural state if desired.

One of the rollers 210 is preferably provided with an automatic stop such as is shown in Figure 12, which is designed to prevent the chain 217 from being pulled too far so that the color roll would be torn loose from the rollers. For this purpose, one end of one of the shafts 211 is threaded with threads of a suitable pitch, and is provided with a traveling nut 218. The nut 218 is prevented from rotating with the threaded shaft 211 by a rod 219 secured at one end in the ear 212 and at the other end in a member 220 mounted within the casing 213 adjacent the end of the roller 210. By properly proportioning the distance between the ear 212 and the member 220, and the pitch of the threads on shaft 211, the nut 218 will come in contact with one stop or the other just as the color roll is completely unwound from the roller, and thus prevent the color roll from being torn loose.

As shown in Figures 1 and 21, a square mirror box supporting rod 250 passes thru a grooved bearing member 251 secured to the center of the front of the cross bar 51. The upper end of rod 250 is secured to a transverse horizontal member 252 which is also supported by a second vertical rod 253, preferably square in cross section, which passes downwardly thru another grooved bearing member 254, fastened to the rear of cross bar 51. A circular rod 255 is secured to supports 256 mounted on each end of the horizontal member 252 and forms a trackway for a sliding rectangular block 257. As is clearly shown in Figure 27, the lower end of vertical rod 250 is connected to one end of a spiral spring 258, the other end of which is secured to a stud 259 mounted on the front of cross bar 51, the entire spring being housed in a recess in bearing member 251. The spring 258 will be wound up when the rod 250 is lowered and unwound when it is raised, thereby partly counterbalancing the weight of the mirror box and making it easier to raise the same.

Means is provided for locking the vertical rods 250 and 253 in the desired position of vertical adjustment. The means for this purpose is clearly shown in Figure 26, and comprises a lever 260 pivoted at 261 to the cross bar 51 and provided with a handle 262. The ends of the lever 260 are cam-shaped and are adapted to engage the inner faces of the rods 250 and 253 and jam the same in the recesses in which they slide.

A cylindrical stud 263 having a reduced portion 264 is secured to the sliding block 257 and fits into a recess in the lower end of a circular rod 265. The rod 265 is provided with a slot in its side thru which extends a bifurcated piece 266, shown clearly in Figures 27 and 29, which engages the reduced portion 264 of stud 263. This construction securely locks the rod 265 against vertical movement relative to the stud 263, but permits rotation thereof.

The sliding block 257 is provided with a ball bearing 267 mounted therein. The construction of this ball bearing 267 is preferably as shown in Figure 28. A hollow cylinder 268, the inside diameter of which is slightly greater than the outside diameter of rod 255, is cut thru in two places along lines at an angle of 45° to its axis, thereby dividing it into three pieces. One end piece is placed in a cylindrical aperture in block 257 and secured thereto by suitable set screws, a row of balls inserted, the middle piece put in next, another row of balls inserted, and the other end piece then put in place and similarly secured to the block 257. The block 257 must, of course, be mounted on the rod 255 at the time the bearing is assembled, as otherwise the balls would fall out. It has been found that the block 257 slides more readily when a bearing of this construction having diagonal rows of balls is employed.

The rod 265 passes upwardly thru a hub 275 having an integral rectangular flange 276 extending therefrom. The flange 276 is provided with strengthening webs 277 on the under side thereof and is mounted for transverse sliding movement on a pair of rails 278 fitting in grooves along its sides. The rails 278 are secured at their rear ends to the vertical panel 65. The front ends of the rails 278 are connected together by a cross piece 279 and to the forward beam 56 by vertical members 280.

The rod 265 is provided along one side thereof with a plurality of rack teeth 281, these teeth being disposed adjacent the hub 275. The hub 275 is provided with a collar 282 extending therethrough between it and the rod 265, as shown in Figure 22. The upper end of this collar is provided with a shoulder 283 which rests upon the top of the hub 275. The collar 282 is provided with a pair of laterally extending ears 284 positioned on either side of the rack teeth 281, and a pinion 285 is mounted between these ears on a shaft 286 in position to engage the rack. The shaft 286 is provided with a hand wheel 287 for rotating the same. A washer 288 is secured to the lower end of the collar 282 in position to engage the lower end of the hub 275, and is adapted, in cooperation with the shoulder 283, to prevent vertical movement of the collar 282 relative to the hub. The washer 288 is cut away along a portion of its circumference to form a sector-shaped recess 289 (Figure 23), the sides of which are adapted to engage a pin 290 set in the hub 275. This construction permits the rod 265 and the collar 282 to rotate as a unit relative to the hub 275 thru the angle subtended by the sector 289. This rotation may be secured by means of the shaft 286 and hand wheel 287.

The upper end of the rod 265 above the rack teeth 281 is reduced in diameter, forming a shoulder 300, on which rests an arm 301, the rod 265 passing thru an aperture in the arm 301 and being freely rotatable relative thereto. The arm 301 is provided with a downwardly extending apertured boss 302 thru which extends a vertical rod 303 which is screwed into a boss 304 on the flange 276. The vertical rod 303 serves to prevent the arm 301 from rotating with the rod 265, and acts also as a brace. The rod 303 extends a short distance up into the mirror box thru an arcuate slot in the bottom thereof, and the boss 302 is prolonged downwardly, in order that the rod 303 may continue to engage the arm 301 when the rod 265 is in its uppermost position. The rod 303 must be short enough so that it will not strike the top of the mirror box when the rod 265 is in its lowest position with the arm 301 engaging the collar 282. Similarly, the boss 302 must not extend down so far as to strike the boss 304 before the arm 301 touches the collar 282.

A member 305 is secured to the upper end of rod 265 and has secured thereto a recessed member 306 on which is mounted a mirror box 307. The mirror box may be of the type disclosed in my Patent No. 1,487,473, issued March 18, 1924, and comprises a bottom 308 and a top 309 connected together at the rear corners by angle bars 310, and at the front corners by vertical frame members 311. As shown in Figure 25, two mirrors 312 are mounted within the box at an angle of 90° to each other and each making an angle of 45° with the front of the box, and are secured to right angled supports 313 fastened to the top 309 and bottom 308, respectively. The mirrors are preferably silvered on their front surfaces and are completely protected from dust and moisture by glass side walls 314, glass front walls 315, and a nose piece 316. A pair of side doors 317 and a pair of front doors 318 are provided and are pivoted on vertical axes to ears secured to the front corners of the box. These doors are preferably geared together, as shown in my patent, so that they are opened or closed simultaneously, and serve to protect the glass side and front panels from dust as well as acting as shields for the observer's eyes when the instrument is being used.

Lenses 325 are secured to blocks 326 which are slidably mounted on arms 327 at either side of the mirror box 307. The inner ends of the arms 327 are secured to gears 328 pivoted on studs 329 secured to member 306, the gears 328 being mounted in a recess in member 306, as shown in Figures 22 and 24. When the apparatus is not in use, the lenses may be moved into proximity with the glass side walls 314 of the mirror box, and be protected behind the side doors 317, as shown in dotted lines in Figure 25. When it is not desired to use the lenses, they may be pushed back out of the way by pushing on one of the arms 327, the other arm being likewise moved back by the action of the gears 328. Pulleys 327' are mounted on the ends of the arms 327, and are connected with each other and with the sliding blocks 326 on which the lenses 325 are mounted, by means of a cord 330, in much the same manner as the illuminating boxes are connected together. Thus by sliding one of the blocks 326 along its arm, the lenses may be moved together or apart in unison in order to properly focus the radiographs. The cord 330 preferably passes thru apertures in the member 305. This construction of the supports for the lenses 325 is covered in my copending application Serial No. 659,983, filed August 29, 1923.

As shown in Figure 22, a vertical rod 350 extends thru the mirror box and is secured at its lower end to the member 306 and is held in place at its upper end by a nut 351 which clamps the rod securely to the mirror box. The rod 350 has a reduced end extending thru a transverse horizontal bar 352 which is rotatably mounted thereon and held in place by means of a nut 353. A T-shaped standard 354 is secured to the front end of the bar 352. A tubular member 355 having ears 356 projecting from each side thereof is secured to the rear end of the bar 352, the head of the T-shaped standard 354 and the ears 356 being in the same horizontal plane. Circular rods or rails 357 are secured between the ears 356 and the standard 354. A circular rod 358 has a reduced end passing thru the aperture in the tubular member 355 and is provided with a nut 359 on the upper end thereof. The lower reduced end of the rod 358 passes thru an aperture in the outer end of arm 301 and is secured thereto by a nut 360. The rod 358 thus serves to hold the bar 352 and its rails 357 from rotating with the mirror box.

A member 361 is provided with arms 362 extending from each side thereof, each of which carries a sleeve 363 at its outer end. The member 361 is arranged to slide on the rails 357, which pass thru the apertures in the sleeves 363. One of the sleeves 363 is provided with a knurled set screw 364, which serves to lock the member 361 in any desired position on the rails 357.

A square rod 365 has a cylindrical portion 366 which is rotatably mounted in a vertical central aperture in the member 361. A nut 367 is threaded onto the lower end of the rod 365, and keeps the same from being pulled out of the member 361. The nut 367 also serves to adjust the tension of a curved spring 368, which bears on the rod 365 and the arms 362 and regulates the ease with which rod 365 may be rotated in its bearing. The upper end of member 361 is threaded and is provided with a knurled locknut 369, which has a shoulder 370 adapted to bear on a flange 371 on the rod 365. By means of this construction, the rod 365 may be locked in any desired rotative position.

Referring particularly to Figures 21, 30 and 31, a collar 375 having arms 376 extending laterally therefrom is adapted to slide vertically on the square rod 365. A set screw 377 is threaded into a boss on the collar and bears on a spring 378, thereby serving both to regulate the force required to move the collar along the rod and to lock the collar in any desired position. The arms 376 are preferably square and are provided with square sleeves 379 adapted to slide therealong. Set screws 380 are provided to lock the sleeves 379 in place. Each sleeve 379 has a depending offset portion, 381, in which is rotatably mounted a vertical member 382, held in place by screw 383 and washer 384. The lower end of member 382 is flat and is provided with a vertical slot 385. A rod 386 has a reduced end which fits in slot 385 and is held in place therein by a horizontal pivot pin 387. A dial 388 is secured to each member 382, and a pointer 389 secured to a washer mounted on rod 386 moves over the face of the dial in accordance with the movements of rod 386 about its horizontal axis. The pointer 389 is so arranged that angles which the rod 386 makes with the horizontal are changed into angles with the vertical on the dial, and the dial is preferably graduated to show angles up to 30° on either side of the vertical axis. The function and manner of use of the dial will be pointed out later. It will be seen that the vertically pivoted member 382 and the horizontally pivoted rod 386 together form a universal joint.

As shown in Figures 1 and 2, a tube 400 is mounted on the top of each illuminating box perpendicular to the front thereof, and is supported at its rear end by an extension of the vertical plate 162 at the back of the casing 157. The tube 400 is also supported in a vertical member 401 secured to the center of the top of the illuminating box frame, and extends a considerable distance in front of the illuminating box. The rear end of each tube 400 is provided with a ball bearing 402 and the front end terminates in a ball bearing 403. The ball bearings 402 may be of the usual type and the ball bearings 403 are preferably similar to the one shown in Figure 28. The rods 386 slide thru the ball bearings 402 and 403 and the tube 400, and are of sufficient length to project entirely thru the the tube 400 when the illuminating boxes are in their extreme outward positions.

It will be seen that the collar 375 will be raised or lowered relative to the illuminating boxes when the mirror box is raised or lowered by manipulation of the hand wheel 287, pinion 285 and rack 281. The collar 375 may also be raised or lowered relative to the illuminating boxes by sliding it along the vertical rod 365. Such raising or lowering of the collar 375 will, as is evident from a consideration of Figure 1, cause the illuminating boxes to be tilted about their horizontal axes. Thus movement of the collar 375 upward from the position shown in Figure 1 will cause the illuminating boxes to be tilted back, while downward movement of the collar will cause the illuminating boxes to be tilted forward. The extent of this tilting will be indicated on the dials 388.

Rotation of the mirror box about its vertical axis by means of the hand wheel 287 will not affect the position of the arms 376 on the collar 375, since the rails 357 are prevented from rotating with the mirror box by the arm 301 and rods 303 and 358. The mirror box may thus be freely rotated to inspect parts of the radiographs near the front or rear edges thereof without disturbing the adjustment of the illuminating boxes.

It is necessary, however, that the illuminating boxes should sometimes be rotated about their vertical axes in order that the proper angle of the light ray from each point on the plate to the observer's eye may be obtained. This adjustment may be secured by rotating the rod 365 in the member 361. This may be conveniently done by pushing on one of the arms 376. The arms 376 will thus be rotated about a vertical axis as shown in Figure 58, with a corresponding movement of the illuminating boxes about their vertical axes. The illuminating boxes will always remain parallel to each other during this movement, as is clearly shown in Figure 58. The rods 386 slide thru the ball bearings of the two tubes 400 during this movement, so that the distance between the illuminating boxes remains unchanged. The angle thru which the illuminating box has been rotated about its vertical axis is preferably indicated on a dial 405, best shown in Figure 2. The front edge of the yoke 106 of the illuminating box may be conveniently employed as a pointer, the dial being, of course, graduated to correspond with the position of this pointer, instead of having its center at the axis of rotation, namely spindle 105.

It is sometimes necessary to make a stereoscopic examination of wet radiographic plates or films which have just been developed, because time is too important to permit of waiting for them to dry. In such cases it is not desirable to mount the plate or film in the regular holders, as the wet radiographs might injure the curtains. I therefore provide auxiliary holders for this purpose. These holders consist of an upper clamp 420 slidably mounted on the tube 400 in front of each of the illuminating boxes, as shown in Figures 19 and 20. This clamp comprises a collar 421 keyed to the tube 400 so as to slide longitudinally thereof, and having projecting side arms 422. These arms 422 are provided with enlarged ends having vertical apertures in which slide rods 423. The rods 423 may be connected at their upper ends by a cross piece 424 and at their lower ends by a cross piece 425. The cross piece 425 supports a spring clip 426 of well known type, between the jaws of which the upper end of the wet film holder may be clamped. The lower end of the plate or film may be clamped between the jaws of a similar clip 427 which is secured on a vertical extension 428 of a sleeve 429. The sleeve 429 is adapted to be slipped over a rod 430 pivoted to the bar 176 of the lower vertical curtain. The sleeve 429 may be removed from the rod 430 when not in use and the rod 430 folded back under the bar 176 where it is out of the way, as shown in Figure 4. By the use of these auxiliary holders it is also possible to secure a greater tilt to the radiograph than is possible with the use of the holders on the illuminating box proper. The manner in which this may be accomplished is illustrated in Figure 20, in which the clip 426 is shown in a position in front of the lower clip 427.

The panel 65 supports two rheostats 440 which are used to control the brilliancy of the lamps 164 in the illuminating boxes. A switch 441 is also mounted on the panel 65 and is adapted to cut off the electric current supply to the lamps. A pointer 442 secured to the cord 115 moves over a scale 443 on the panel 65, and serves to indicate the distance between the illuminating boxes and the mirror box. By adding to this figure a factor which depends upon the relation of the particular observer's eyes to the mirror box, the distance from the observer's eyes to the radiograph plates in the illuminating boxes may be readily obtained. This distance should be the same as the distance from the target of the X-ray tube to the plate where the radiograph was exposed.

Figures 33 and 34 show a marker 450 which is adapted to be used in connection with my improved stereoscope. This marker is fully described and claimed in my co-pending application, Serial No. 388,848, filed August 27, 1929. The marker consists of a circular dial 451 having a pointer 452 pivoted thereto at its center. The marker is provided with four scales, scales A and B at the top, scale C at the right and scale D at the left. Scale A reads to 30° to the left of the vertical line, scale B reads to 30° to the right of the vertical line, and scales C and D read to 30° above the horizontal line. The vertical axis of the dial 451 has the letters BP stamped thereon, which stand for "body plane", the meaning of which will be explained hereinafter. A circular insert 453 is rotatably mounted on the dial near the top thereof with its center lying on the vertical BP axis. The letters L and R, denoting the left and the right shift positions of the X-ray tube, respectively, are stamped on the insert 453. As shown in the drawing, these letters L and R may be made somewhat fancifully so as to include the conventional symbol for an X-ray tube therein. The insert 453 may be freely rotatable, but I prefer to provide stops to limit its rotation to an angle of 90°. The dial also includes slots 454, 455, 456 and 457, which are adapted to contain removable letters or figures. These symbols or numerals may be secured in the grooves in any desired manner, as by undercutting the sides of the grooves and providing the symbols with beveled edges, or may simply rest in the grooves when the marker is to be used in a horizontal position. The letters in the slot 454 indicate the position of the body being photographed with respect to the target of the X-ray tube and the plate. Thus the letters PA stand for "posterior anterior", and, reading from the target to the cassette, this indicates that the back of the patient is toward the target and his face toward the plate. The letters AP may be used to indicate the opposite position. Where a right or a left limb is being radiographed, a prefix R or L may be used before the letters PA or AP. The numerals in the slot 455 denote the distance in inches between the center of the line connecting the two positions of the target and the center of the cassette when the radiographs were exposed. An arbitrary plate number may be inserted in the slot 456, and the numbers in the slot 457 denote the date on which the radiograph was exposed.

Inasmuch as the information on the disk is to be radiographed directly on the plate, it is apparent that portions thereof should permit the relatively free passage of the X-rays and that other portions should hinder or obstruct the passage of the X-rays. To this end I preferably form the disk 451 of aluminum, thru which the X-rays will readily pass, and form the indicating elements mounted thereon of lead, iron, steel or other metal which is opaque or nearly opaque to the X-rays. On the other hand, the disk itself might be made of lead and holes or apertures made therein. Other materials may be selected, as will be apparent to one skilled in radiographic work.

The cassette is a lightproof holder in which the radiograph plate is mounted and the cassette plane is the plane of this holder, which naturally is the same as the plane of the radiograph plate or film. The body or object to be radiographed is always placed in immediate proximity to the cassette. The body plane is the plane passing thru the central longitudinal axis of the body perpendicular to the cassette plane. The body is arranged either lengthwise or crosswise of the plate in the cassette and centrally thereof. The body plane therefore passes thru one of the axes or center lines of the cassette. The transverse plane is the plane perpendicular to the cassette and passing thru the other center line or axis thereof transverse to the body plane, from which fact it derives its name. It will thus be seen that the cassette plane, the body plane, and the transverse plane are all perpendicular to each other, and form in effect the three coordinate planes of a system of space coordinates. The tube target is usually a cylinder with an inclined end face. The tube target plane, or more briefly, the tube plane, is the plane from which the X-rays are emitted, that is to say, it is the plane passing thru the center of the face of the tube target and perpendicular to a line bisecting the angle formed by lines connecting the center of the cassette with the center of the face of the target in its two shift positions. These terms will be used herein exclusively as above defined, and the indications on the marker are designed to bear a definite relation thereto, as described below.

The cassette is usually used in either a vertical or a horizontal position, depending upon whether the patient is standing or reclining. However, the cassette may be angled as described below when the necessity of photographing certain parts of the body makes this desirable. In the illustrations given below, the cassette is either horizontal or angled slightly to the horizontal, but it is to be understood that these positions are taken merely for convenience of illustration, and that the same considerations govern the use of my marker in no matter what position the cassette is placed.

The ordinary conventional position for taking radiographs is with the tube plane parallel to the cassette plane. The tube is placed so that the center of the face of its target lies on a line perpendicular to the cassette at its center, with the target at a distance of about 25 inches from the plate. The tube is then moved one-half of the average interpupillary distance to one side of the 90° center line and the first radiograph exposed, care being taken to keep the tube plane the same. The second radiograph plate is then put in position and the tube is moved back the whole interpupillary distance, so that the second radiograph is taken from a corresponding position on the opposite side of the 90° center line. This movement of the tube is called the tube shift or shift movement. The line of the shift movement, that is, the line connecting the two shift positions of the target, always lies in the tube plane, so that the tube plane is the same for both shift positions. In other words, the tube plane corresponds to the plane of the observer's eyes. This results in having two radiographs each taken from a position corresponding to the positions which would be occupied by the human eyes in looking directly at the body from a position immediately in front of the same.

The tube shift is always made with the line of the shift movement either coincident with the line of intersection of the tube plane and the body plane or perpendicular thereto. In the former case, the shift is said to be with the body plane, and in the latter, across the body plane. When the rotatable insert 453 is in the position shown in Figure 33, it indicates that the radiographs were exposed with the tube shift across the body plane, because the symbols L and R are on opposite sides of the vertical BP axis. To indicate that the tube shift is with the body plane, the insert 453 should be turned thru a right angle to the position shown in Figure 37, where the symbols L and R lie on the BP axis.

Of course, it is theoretically possible to place the tube in such positions that the line of the shift movement is neither coincident with, nor perpendicular to, the line of intersection of the tube plane and the body plane, but in practice this is never necessary, and would only introduce undesirable complications. It will be obvious however, that even this condition could be indicated on my marker by graduating the periphery of the insert 453 in degrees, to indicate the angle which the line of the shift movement makes with the line of intersection.

In making a radiograph, the parts of the body of greater density prevent the parts of lesser density lying behind the same from registering on the film or plate. Therefore, in order to study such parts of lesser density, it is necessary to place the tube at an angle to the plate, so that the rays from the target miss the dense bone and register the cavities on the film. The required angle between the tube plane and the cassette plane may be obtained by moving either the cassette or the tube, or both. Whether it is preferable to move the cassette or the tube depends largely on the part of the body which it is desired to radiograph. The plate is always kept as close as possible to the parts which are to be studied. For example, in studying the air sinuses of the head, the cassette is usually angled, the head, of course, remaining in proximity to the cassette. In making a radiograph of the lungs, it is customary to move the tube so that the rays pass between the sternum and the vertebræ, thus registering the parts of lesser density lying behind these parts. The customary procedure is to move the tube, as this is the more easily accomplished. It is rarely necessary in practice to angle both the cassette and the tube, but even this condition may be readily indicated on my marker, since it shows the relative positions of the various planes.

The angle between the cassette plane and the tube plane is usually made so that the line of intersection between the cassette plane and the tube plane is either perpendicular to the body plane or parallel thereto. When the former is the case, the angle is said to be with the body plane; when the latter, across the body plane. When the angle is with the body plane, so that the true size of the angle is projected on the body plane, the angle is indicated on the top scales A or B of the dial 451. When the angle is across the body plane, so that its true side is projected on the transverse plane, the angle is indicated on either scale C or scale D at the sides of the dial 451. In either case the pointer 452 indicates the acute angle in degrees between the tube plane and the cassette plane. When the tube plane is parallel to the cassette plane, the pointer is placed in the position shown in Figure 33.

It is obvious, of course, that a given angle between the tube plane and the cassette plane may be with the body plane in either of two directions, and the same for an angle across the body plane. That is, for a given angle with the body plane, the line of intersection between the tube plane and the cassette plane may be perpendicular to the body plane on either side of the transverse plane, and for a given angle across the body plane, the line of intersection may be parallel to the body plane on either side thereof. In order to secure the proper angulation of the radiograph in the stereoscope it is necessary to clearly distinguish between these various positions. For this purpose, I make use of an entirely arbitrary set of rules or definitions. I assume that the object to be radiographed is a human being in the posterior anterior position, that is, with his back towards the target of the X-ray tube and his face towards the plate in the cassette. When the tube is moved towards the patient's head from the normal center position, the resulting angle with the body plane will be indicated on the right hand top scale B. When the tube is moved towards the patient's feet, the left hand top scale A is used. Similarly, a movement of the tube toward the patient's right hand is indicated on the scale D at the right side of the dial, and to the left on the left scale C. It is readily apparent that these arbitrary definitions might be reversed or otherwise changed if desired, it being necessary only that the same set of definitions be used in both taking and viewing the radiographs.

It is possible to have the angle between the tube plane and the cassette plane neither with the body plane nor across the body plane. The necessity for so doing practically never arises in practice, but if it should be desired to do so, the situation may be met by adding a second pointer to the marker. The manner of using these two pointers will be obvious from the following considerations. It is to be noted that when the angle between the cassette plane and the tube plane is with the body plane, this angle is shown in its true size on the body plane as the angle between the line of intersection of the cassette plane and the body plane and the line of intersection of the tube plane and the body plane, and is indicated on scales A or B. Furthermore, when the angle between the cassette plane and the tube plane is across the body plane, this angle is shown in its true size on the transverse plane as the angle between the line of intersection of the cassette plane and the transverse plane and the line of intersection of the tube plane and the transverse plane. Hence if the tube plane is angled both horizontally and vertically with respect to the cassette plane, one pointer would be used to indicate on scale A or B the angle between the lines of intersection of the body plane and the cassette plane and of the body plane and the tube plane, respectively, while the second pointer would indicate on scale C or D the angle between the lines of intersection of the transverse plane and the cassette plane and of the transverse plane and the tube plane, respectively. The left and right indications, that is, whether scale A or B, or scale C or D, would be employed, would remain the same as before. The four possible combinations of any two of the four scales A, B, C and D, will furnish a sure indication that the tube was located above a definite one of the four quadrants marked on the cassette plane by the body plane and the transverse plane.

The line of shift movement, as stated above, must always be in the tube plane, whether the tube plane is angled or not. Moreover, the shift positions are always so chosen that the distance from the center of the cassette to the center of the face of the target is the same for each shift position of the tube. In other words, the line from the center of the cassette to the center of the line connecting the two shift positions is perpendicular to the latter line. This corresponds to having the observer's eyes focused upon the center of the cassette, and the focal distance is the same as the distance which is recorded in the slot 455 on the marker 450.

As in the case where the tube plane is parallel to the cassette plane, the tube shift may be either with the body plane or across the body plane. The definitions given above hold true here also, except that for a shift with the body plane, the line of the shift movement will not be coincident with the line of intersection of the tube plane and the body plane, but parallel thereto.

When the radiographs are exposed, the marker is always placed on a certain fixed corner of the cassette, preferably the upper right hand corner. Assuming the object to be radiographed to be a human being in the posterior anterior position as above described, this will be the corner of the plate nearest the patient's right hand. The marker is placed in such a position on the cassette that the BP line thereon parallels the body plane, which in the case assumed, will pass through the patient's spinal column. By so placing the marker, the diagnostician is enabled to tell the position of the body by a glance at the radiographed, and by uniformly placing the marker in the same corner of the plate being exposed, the radiograph may be readily mounted in its correct position in the illuminating box of the stereoscope.

It will thus be seen that the marker 450 serves to permanently record on the radiograph the relative positions of the body, the tube, and the plate, or more particularly, it indicates:

1. The position of the body plane or, in other words, the longitudinal axis of the body, with respect to the plate.
2. The position of the body with respect to the target and the plate.
3. Whether the tube shift is with the body plane or across the body plane.
4. The angle in degrees between the cassette plane and the tube plane.
5. Whether this angle is with the body plane or across the body plane.
6. Whether the tube has been moved towards the head or the foot of the patient for a given angle with the body plane, or towards his right or left for a given angle across the body plane.
7. The mean distance between the tube target and the cassette.
8. The serial number of the radiograph.
9. The date of exposure of the radiograph.

The foregoing will be made clearer by a consideration of Figures 35 to 54 inclusive. For convenience, all of the usual positions of the tube and the cassette relative to each other are listed below in tabular form, and the figures in which a position is illustrated noted thereafter. Not all of these usual positions are illustrated, but those which are omitted will be obvious from those which are shown.

The situation where the angle is oblique to the body plane is quite rare and is not included in this table for that reason. It has been sufficiently discussed above, and the manner in which the two pointers 452 which are necessary would be used has been fully explained. Positions where the shift movement is oblique to the body plane are also omitted. As pointed out above, such positions are never used because there is nothing to be gained thereby and they would introduce series mechanical difficulties in mounting the plates in the stereoscope.

*Case I. Tube plane parallel to cassette plane*

1. Shift with the body plane—Figures 35 to 37 inclusive.
2. Shift across the body plane—Figures 38 to 40 inclusive.

*Case II. Tube plane and cassette plane at an angle to each other*

1. Shift with the body plane.
    A. Angle with the body plane.
        a. Tube moved towards head of patient.
        b. Tube moved towards foot of patient—Figures 45 to 47 inclusive.
    B. Angle across the body plane.
        a. Tube moved towards right of patient.
        b. Tube moved towards left of patient—Figures 51 to 54 inclusive.
2. Shift across the body plane.
    A. Angle with body plane.
        a. Tube moved towards head of patient—Figures 41 to 44 inclusive.
        b. Tube moved towards foot of patient.
    B. Angle across the body plane.
        a. Tube moved towards right of patient—Figures 48 to 50 inclusive.
        b. Tube moved towards left of patient.

In each of Figures 35, 38, 41 and 42, 45, 48, and 51 and 52, the dotted lines 460 and 461, which originate at the center of the cassette would, if extended upwardly, pass directly to the center of the face of the target in each of its two shift positions. These figures illustrate the radiographing of parts of a patient's body with the tube and the cassette in various relative positions. The right hand figures on the same horizontal line therewith show the corresponding settings of the indicating members on the marker 450, and the left hand figures show diagrammatically a front elevation of one of the resulting radiograph plates.

After the radiographs have been exposed and developed, they are placed in the illuminating boxes so that the direction of the shift parallels the position of the observer's eyes. That is, the LR line should always be horizontal, as shown in Figures 36, 39, 43, 46, 49 and 53. It will be apparent from this that if the shift is across the body plane, the radiographs should be placed in the illuminating boxes so that the marker bears the same relation to the illuminating box that it bore to the cassette, that is it should appear in the upper right hand corner of the same. If the shift movement is with the body plane, the image of the marker on the radiograph should appear in the lower right hand corner of the illuminating box, in order to obtain a true stereoscopic view.

Inasmuch as two films are exposed at different angles in each set, it is necessary to know which is to be placed in the right hand illuminating box of the stereoscope and which is to be placed in the left hand box. Obviously, the shadow of the object being radiograped will occupy slightly different positions on the two films, due to the interpupillary shift. By superimposing the two radiographs and looking at them in such manner that the letters LR on the marker appear in their normal reading position, the right hand and the left hand radiographs may be readily distinguished, because the right shift will displace the body slightly to the left, and vice versa. The radiograph taken in the right shift position should be mounted in the right hand box of the stereoscope, and the one taken in the left shift position in the left hand box. It will be obvious to one skilled in the art that the films may be placed in the illuminating boxes in positions different from those above defined, and that in this manner various pseudo-scopic views may be obtained.

In order to properly adjust the stereoscope, each illuminating box must bear such relation to the mirror box that the rays reflected to the observer's eye from the corresponding illuminating box will bear substantially the same relation thereto as the rays from the tube target bore to the film or cassette during exposure. After the radiographs have been properly mounted in the illuminating boxes as described above, the BP line on the marker 450 will be either horizontal or vertical. When the BP line is horizontal, angles with the body plane indicated on scales A or B of the marker, must be duplicated on the horizontal dials 405, the illuminating boxes being rotated about their vertical axes by turning rod 365 and consequently arms 376 as shown in Figure 58; and angles across the body plane, indicated on scales C or D, must be duplicated on the vertical dials 388 by raising or lowering the member 375 relative to the rod 365, thereby tilting the illuminating boxes about their horizontal axes. When the BP line is vertical, the reverse is true.

In each case, the illuminating boxes are turned in such a direction about the axis in question, that the portion of the plate which was nearest the tube will also be nearest the observer's eye. For example, when the shift is across the body plane, the angle is with the body plane, and the tube is moved towards the patient's head, as shown in Figures 41 to 44, inclusive, the angle is indicated on the right hand top scale B, and the illuminating boxes must be tilted forward or towards each other, so that the top or head end of each plate is closer to the observer's eye than the foot end. The other positions may be similarly worked out.

The angulation of each radiograph in the stereoscope with respect to the observer's eye will now correspond exactly to the angulation of the cassette with respect to the tube. If the measurements have been carefully made, and the apparatus accurately adjusted to its correct position, the images of the two radiographs should exactly fuse for an observer with normal eyes so as to form a single component image in relief. Slight errors in alignment may occur, but it will be obvious that these may be readily corrected after the major adjustments have been made.

The above directions for placing the radiographs in the stereoscope and setting the latter in accordance with the indications on the marker, assuming that the marker was used as above described when the radiographs were exposed, may be briefly summarized as follows:

I. Superimpose the radiographs
    A. When the shift is across the body plane (LR line perpendicular to BP line), hold the radiographs so that the image of the marker appears in the upper right hand corner.
    B. When the shift is with the body plane (LR line coinciding with BP line), hold the radiographs so that the image of the marker appears in the lower right hand corner.

II. Place the radiograph with the image of the body displaced to the left in the right hand illuminating box, and vice versa, keeping the marker in the same relative position as above described.

III. Turn the handle 111 until the pointer 442 reads on scale 443 the same distance as is indicated in the slot 455 on the marker.

IV. Duplicate the target exposure angles.
    A. When the pointer 452 is on the zero mark, the angle controls are also placed in their zero positions, so that the dials 388 and 405 read zero.
    B. When the pointer 452 indicates an angle between the tube plane and the cassette plane, rotate the illuminating boxes so that the end or side of the radiograph associated with the scale on which the pointer rests is brought toward the mirror box, i. e., scale A indicates foot or bottom of radiograph, scale B head or top, scale C left, and scale D right. Two main cases may be distinguished:
        1. Where the shift and the angle are both with or both across the body plane, or, in other words, where the shift is with the angle (pointer 452 on scale A or scale B, LR line coinciding with BP line; or pointer on scale C or D, LR line perpendicular to BP line), duplicate angle on dials 405 by rotating central angle control member 375 relative to the mirror box.
        2. Where the shift is across the body plane and the angle is with the body plane, or vice versa, or, in other words, where the shift is across the angle (pointer 452 on scale A or scale B, LR line perpendicular to BP line; or pointer or scale C or D, LR line coinciding with BP line), duplicate angle on dials 388 by raising or lowering central angle control member 375 relative to rod 365.

If the observer's eyes do not normally focus at the distance which the radiographs were from the target at the time of exposure, this may be corrected so that the observer will see the radiographs in true stereorelief by moving the mirror box forward or back. As shown diagrammatically in Figure 55, this movement will not destroy the proper angulation of the light rays from the plates to the observer's eyes.

It may happen that the observer's interpupillary distance does not exactly correspond to that used when the radiographs to be examined were exposed. For example, the target of the X-ray tube may have been shifted two and one-half inches between the exposures, and the observer's interpupillary distance may be two and one-quarter or two and five-eights inches. A correction may be made to meet these conditions by sliding the member 361 forward or backward on the rails 357 from its normal position for an interpupillary distance of two and one-half inches. If desired the rails 357 may be graduated for various interpupillary distances, and a cooperating mark or pointer affixed to the member 361.

Once having obtained the proper angulation, it will be apparent that the illuminating boxes and the mirror boxes of my stereoscope are so coordinated that a movement of the mirror box will result in a corresponding movement of the illuminating box so that the correct angulation of the two is maintained throughout the examination of the radiographs. The construction and operation of the parts for this purpose have been fully described above. Thus, Figure 56 shows how the mirror box may be raised or lowered to view parts near the top or bottom of the plates without disturbing the angulation of the plates relative to the eyes, and Figure 57 shows how the same result may be secured while rotating the mirror box to inspect parts near the front or back edges of the plates.

The advantages and mode of operation of my invention will be apparent to one skilled in the art from the description above given.

Many alterations or modifications might be made in the structure above described without affecting the spirit of my invention, and my invention therefore includes all such changes which fall within the scope of the appended claims.

Having thus described my invention, what I claim as new and desire to secure by Letters Patent is:

1. A stereoscopic apparatus, comprising in combination, a support, two radiograph supports mounted thereon, a binocular reflecting device mounted on the support between said radiograph supports, and means for tilting said radiograph supports about both vertical and horizontal axes, including means for moving said reflecting device vertically or horizontally with respect to said support, a rod slidably mounted on each of said radiograph supports, and a universal pivotal connection between each of said rods and said reflecting device.

2. A stereoscopic apparatus, comprising in combination, a support, two radiograph supports mounted thereon, a binocular reflecting device mounted on the support between said radiograph supports, and means for tilting said radiograph supports about both vertical and horizontal axes, including a vertical member rotatably mounted on said reflecting device, a second member adapted to slide longitudinally of said vertical member and to rotate therewith, and a universal pivotal connection between each of said radiograph supports and said second member.

3. A stereoscopic apparatus, comprising in combination, a support, two radiograph supports mounted thereon, a binocular reflecting device mounted on the support between said radiograph supports, and means for tilting said radiograph supports about both vertical and horizontal axes, including a vertical rod rotatably mounted on said reflecting device, a member adapted to slide longitudinally of said vertical rod and to rotate therewith, a rod slidably mounted on each of said radiograph supports, and a universal pivotal connection between each of said rods and said member.

4. A stereoscopic apparatus, comprising in combination, a support, two radiograph supports mounted thereon and adapted to be tilted about both vertical and horizontal axes, a binocular reflecting device mounted on the support between said radiograph supports, means for moving said reflecting device vertically or horizontally with respect to said support, means for rotating said reflecting device about a vertical axis, a member mounted on said reflecting device so as to move vertically or horizontally therewith, means for holding said member stationary when said reflecting device is rotated, said member being rotatable independently of said reflecting device, a second member mounted on said first member and adapted to be moved vertically with respect thereto, and a universal pivotal connection between each of said radiograph supports and said second member.

5. A stereoscopic apparatus including in combination, a support, a binocular reflecting device mounted thereon, and a pair of radiograph supports mounted on said support on either side of said reflecting device, each of said radiograph supports comprising a plate holder, a source of illumination behind the same, and means for controlling the color of the light from said source.

6. A stereoscopic apparatus including in combination, a support, a binocular reflecting device mounted thereon, and a pair of illuminating boxes mounted on said support on either side of said reflecting device, each of said boxes comprising a source of light, a radiographic plate holder, and a color screen between said light source and said holder.

7. A stereoscopic apparatus including in combination, a support, a binocular reflecting device mounted thereon, and a pair of illuminating boxes mounted on said support on either side of said reflecting device, each of said boxes comprising a source of light, a radiographic plate holder, and a chromatic screen having sections of different colors wound on rollers so as to pass between said light source and said holder as the rollers are rotated.

8. A stereoscopic apparatus including in combination, a support, a binocular reflecting device mounted thereon, and a pair of illuminating boxes mounted on said support on either side of said reflecting device, each of said boxes comprising a source of light, a radiographic plate holder, a chromatic screen having sections of different colors wound on rollers so as to pass between said light source and said holder as the rollers are rotated, and means to limit the rotation of said rollers in either direction, said means being so arranged that the further rotation of either roller in the unwinding direction will be prevented when the screen is almost completely unwound therefrom.

9. Stereoscopic apparatus, including in combination, a support, a binocular reflecting device, two illuminating boxes, each box having a radiographic plate illuminating light, shade mechanism associated with each box for intercepting light rays passing from the light towards the reflecting device, and radiographic plate or film holders mounted on said shade mechanism and comprising a flat member secured to said shade mechanism, a roller mounted adjacent said flat member, and means for pressing said roller into close contact with said member, whereby a film or plate may be clamped therebetween.

10. Stereoscopic apparatus, including in combination, a support, a binocular reflecting device two illuminating boxes, each box having a radiographic plate illuminating light, shade mechanism associated with each box for intercepting light rays passing from the light towards the reflecting device, and radiographic plate or film holders mounted on said shade mechanism and comprising a flat member secured to said shade mechanism, a toothed wheel mounted adjacent said flat member in fixed relation thereto, a second toothed wheel mounted to rotate around said first wheel, a roller carried by said second wheel, and means for normally pressing said roller into close contact with said flat member.

11. Stereoscopic apparatus, including in combination, a support, a binocular reflecting device, two illuminating boxes, each box having a radiographic plate illuminating light, and shade mechanism associated with each box for intercepting light rays passing from the light towards the reflecting device, comprising a pair of shades mounted on rollers at opposite sides of said box, means on the outer ends of said shades for holding a radiographic plate or film, means for moving said shades together or apart in unison, and means for moving said shades simultaneously in either direction without changing the distance between the ends of the same.

12. Stereoscopic apparatus, including in combination, a support, a binocular reflecting device, two illuminating boxes, each box having a radiographic plate illuminating light, and shade mechanism associated with each box for intercepting light rays passing from the light towards the reflecting device, comprising a pair of shades mounted on rollers at opposite sides of said box, means on the outer ends of said shades for holding a radiographic plate or film, means for rotating one of said rollers, and selectively operable means connected to said roller operating means for rotating the second roller an equivalent amount in either the same or the opposite direction.

13. Stereoscopic apparatus, including in combination, a support, a binocular reflecting device, two illuminating boxes, and means for holding a plate or film in front of each of said illuminating boxes, comprising a clip secured to the front of said illuminating box near one side thereof, a rod mounted on the opposite side of said box and extending forwardly thereof, and a second clip slidably mounted on said rod.

14. A stereoscopic apparatus, comprising in combination, a support, two radiograph supports mounted thereon and adapted to be tilted about both vertical and horizontal axes, a platform movable transversely of said support, a binocular reflecting device rotatably mounted on said platform, means for raising or lowering said device relative to said platform, a vertical rod rotatably mounted on said reflecting device so as to be raised or lowered therewith, means connecting said rod and said platform for preventing the rod from rotating with the reflecting device, and universal pivotal connections between said rod and each of said radiograph supports.

15. A stereoscopic apparatus, comprising in combination, a support, two radiograph supports mounted thereon and adapted to be tilted about both vertical and horizontal axes, a platform movable transversely of said support, a binocular reflecting device rotatably mounted on said platform, means for raising or lowering said device relative to said platform, a vertical rod rotatably mounted on said reflecting device so as to be raised or lowered therewith, means for moving said rod transversely of said reflecting device, means connecting said rod and said platform for preventing the rod from rotating with the reflecting device, and universal pivotal connections between said rod and each of said radiograph supports.

16. A stereoscopic apparatus, comprising in combination, a support, two radiograph supports mounted thereon, so as to be tiltable about both vertical and horizontal axes, a platform movable transversely of said support, a binocular reflecting device rotatably mounted on said platform, means for raising or lowering said device relative to said platform, a vertical rod rotatably mounted on said reflecting device so as to be raised or lowered therewith, means connecting said rod and said platform for preventing the rod from rotating with the reflecting device, a member adapted to slide vertically on said rod, rods slidably mounted on each of said radiograph supports, and a universal pivotal connection between each of said last named rods and said member.

17. A stereoscopic apparatus, comprising in combination, a support, two radiograph supports mounted thereon adapted to be tilted about both vertical and horizontal axes, a platform movable transversely of said support, a binocular reflecting device rotatably mounted on said platform, means for raising or lowering said device relative to said platform, a vertical rod rotatably mounted on said reflecting device so as to be raised or lowered therewith, means for moving said rod transversely of said reflecting device, means connecting said rod and said platform for preventing the rod from rotating with the reflecting device, a member adapted to slide vertically on said rod, rods slidably mounted on each of said radiograph supports, and a universal pivotal connection between each of said last named rods and said member.

18. A stereoscopic apparatus, comprising in combination, a plurality of legs, a vertical guideway secured thereto, a rod adapted to slide in said guideway, a table secured to said rod, two radiograph supports and a binocular reflecting device mounted on said table, and a weight connected to said rod and adapted to counterbalance the weight of said table and associated parts, whereby the same can be held in any desired position of adjustment.

19. Stereoscopic apparatus, including in combination, a support, a binocular reflecting device, two illuminating boxes, each box having a film illuminating light, and shade mechanism associated with each such box for intercepting light rays passing from the light toward the reflecting box, said mechanism being adjustable to provide a central light aperture and comprising a plurality of members movable toward and away from a central point to enlarge or restrict the central aperture or vary its size.

20. Stereoscopic apparatus, including in combination, a support, a binocular reflecting device, two illuminating boxes, each box having a film illuminating light, shade mechanism associated with each such box for intercepting light rays passing from the light toward the reflecting device, said mechanism being adjustable horizontally and vertically to provide a central light aperture of variable size, and means including a single rotatable element for manually adjusting said shade mechanism.

21. Stereoscopic apparatus, including in combination, a support, a binocular reflecting device, two illuminating boxes, each box having a film illuminating light, and shade mechanism associated with each such box for intercepting light rays passing toward the reflecting device, said mechanism including two vertically movable and two horizontally movable shade members adjustable toward or away from a common point to provide a light aperture, and means for moving the horizontally adjustable shade members or the vertically adjustable shade members, or all of the shade members simultaneously, whereby the shape of the aperture may be altered as desired.

22. Stereoscopic apparatus, including in combination, a support, a binocular reflecting device mounted on the support for movement transversely thereof, two film supporting members, each mounted on the support for rotation about a vertical axis, and means for connecting the reflecting device to said members so that transverse movement of the reflecting device causes rotation of said members.

23. Stereoscopic apparatus, including in combination, a support, a binocular reflecting device mounted on the support for movement vertically thereof, two film supporting members each mounted on the support for rotation about a horizontal axis, and means for connecting the reflecting device to said members so that vertical movement of the reflecting device causes simultaneous rotation of the illuminating boxes.

24. Stereoscopic apparatus, including in combination, a support, a binocular reflecting device mounted on the support for horizontal and vertical movement, two film supporting members, each mounted on the support for rotation about a horizontal axis and about a vertical axis, and means connecting the reflecting device to the film supporting members so that movement of the reflecting device either vertically or horizontally causes simultaneous rotation of the said film supporting members.

25. Stereoscopic apparatus, including in combination, a support, two spaced members mounted on the support each designed and constructed to hold a plate or film in such manner as to be adjustable about a vertical and about a horizontal axis, a reflecting means positioned intermediate the plate holding members and adjustable vertically and horizontally in a plane transverse to a line through the film holding members, and connections between the reflecting means and the said members whereby said members are adjusted simultaneously with the reflecting means to maintain the films in predetermined angular relationship to the observer's line of sight.

26. Stereoscopic apparatus, including in combination, a support, two spaced members mounted on the support each designed and constructed to hold a plate or film in such manner as to be adjustable about a vertical and about a horizontal axis, a reflecting means positioned intermediate the plate holding members and adjustable vertically and horizontally in a plane transverse to a line through the film holding members, and connections between the reflecting means and the film holding members whereby said members are adjusted simultaneously with the reflecting means to maintain the films in predetermined angular relationship to the observer's line of sight and at a predetermined distance from the reflecting means.

27. Stereoscopic apparatus, including in combination, a support, two spaced plate holding members mounted on the support for movement toward or away from each other, a reflecting means positioned intermediate the plate holding devices and adjustable horizontally in a plane transverse to a line through the film holding members, and connections between the reflecting means and said plate holding members whereby the latter and hence the plates are maintained at a predetermined distance from the reflecting device for all horizontal adjustments thereof.

28. A stereoscopic apparatus comprising in combination, a binocular reflecting device, two plate supporting members one on each side of said reflecting device and each mounted for tilting movement about a horizontal axis, a support upon which said device, and said members as a group, are mounted for relative movement vertically, said members being disposed at all times horizontally opposite one another, and means connecting the reflecting device and each of the plate supporting members whereby the said members are simultaneously rotated on their axes upon the occurrence of such relative vertical movement.

29. A stereoscopic apparatus comprising in combination, two plate supporting members spaced apart and mutually facing each other, each member being mounted for tilting movement about a horizontal axis, a binocular reflecting device positioned midway between said members, means supporting the said members and device for vertical relative movement, the said plate supporting members being at all times disposed horizontally opposite one another, and a connection between said reflecting device and each plate supporting member whereby both members are tilted simultaneously about their horizontal axes upon the occurrence of such relative vertical movement.

30. The combination set forth in claim 29 in which manually operable mechanism is provided for effecting the relative vertical movement mentioned and which mechanism locks the members and device in each relative position to which they are adjusted.

31. The combination set forth in claim 29 in which a dial and pointer is incorporated in one of the connections between the reflecting device and plate supporting members, to indicate the extent of angular adjustment.

32. The combination set forth in claim 29 in which each connection includes an element slidably mounted on the associated plate supporting member and an element connected to the reflecting device, said elements being pivotally connected together, a pointer connected to one element adjacent the pivot and a dial attached to the other element adjacent the pivot, the pointer being arranged to play over the dial and to indicate the extent of angular adjustment of said plate supporting member.

33. Stereoscopic apparatus, including in combination, a support, a binocular reflecting device, two film supporting members in horizontal spaced relation, the binocular reflecting device being positioned midway between said members, and each of said members being mounted for swinging movement about a horizontal and a vertical axis, means for supporting said device and members for relative movement vertically or horizontally so that said device may be caused to occupy various positions, relatively to said members, in a plane normal to a line connecting said members, and means connecting the reflecting device to the film supporting members so that relative movement of the device and members results in rotation of said members about their horizontal or vertical axes, or both, for the purpose set forth.

34. An illuminating box for stereoscopic apparatus including in combination, a casing having a light opening of relatively large size as compared with the films or plates to be observed, a film illuminating light in said casing, and shade mechanism associated with said casing for shielding or blocking off rays of light other than those which pass through a film or plate positioned in said light opening, said mechanism including two extensible shades, positioned respectively on opposite sides of said opening and forming an aperture, the inner edges of said shades being substantially parallel and adapted to move relatively to each other in the plane of the aperture, and means on each of said inner edges for retaining the edge of a plate or film, such plate or film bridging the opening between the edges of the shades and moving with such shades to desired position when they are both moved simultaneously in the same direction.

35. The combination set forth in claim 34 in which the shades are mounted on parallel rollers respectively, and a common operating means is provided for manipulating the rollers.

36. The combination set forth in claim 34 in which the film or plate retaining means comprise spring operated rollers mounted on the edges of the shades respectively.

In testimony whereof I hereunto affix my signature.

WILLIAM P. REAVES.